United States Patent
Pugh et al.

(10) Patent No.: US 11,637,833 B2
(45) Date of Patent: *Apr. 25, 2023

(54) UNIFIED WORKSPACE FOR THIN, REMOTE, AND SAAS APPLICATIONS

(71) Applicant: VMware, Inc., Palo Alto, CA (US)

(72) Inventors: William Pugh, Seattle, WA (US); Michael Eakes, San Francisco, CA (US); Ojvind Bernander, Palo Alto, CA (US); Pradyumna Gundavaram, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,197

(22) Filed: Apr. 27, 2022

(65) Prior Publication Data
US 2022/0255939 A1  Aug. 11, 2022

Related U.S. Application Data

(63) Continuation of application No. 16/994,111, filed on Aug. 14, 2020, now Pat. No. 11,343,250, which is a
(Continued)

(51) Int. Cl.
*G06F 3/00*        (2006.01)
*H04L 9/40*        (2022.01)
(Continued)

(52) U.S. Cl.
CPC ............ *H04L 63/10* (2013.01); *G06F 21/105* (2013.01); *G06F 21/41* (2013.01);
(Continued)

(58) Field of Classification Search
None
See application file for complete search history.

(56) References Cited

U.S. PATENT DOCUMENTS 7,665,127 B1 *  2/2010  Rao .................... H04L 63/0815
                                                            726/20
7,779,091 B2    8/2010  Wilkinson et al.
(Continued)

FOREIGN PATENT DOCUMENTS

WO    WO 2005/002131    1/2005

OTHER PUBLICATIONS

"Software as a Service," retrieved from URL <http://en.wikipedia.org/index.php?title-Software_as_a_service&oldid-281046898>, retrieved on Nov. 2, 2011, Aug. 26, 2010, 9 pages.
(Continued)

*Primary Examiner* — Thanh T Vu
(74) *Attorney, Agent, or Firm* — Dinsmore & Shohl LLP

(57) ABSTRACT

Application-manager software authenticates a user of a client device over a channel. The authentication operation is performed using a directory service. The application-manager software presents a plurality of applications in a GUI displayed by the client device. The plurality of applications depends on the authentication, the client device, and the channel. And the plurality of applications includes a thin application and a software-as-a-service (SaaS) application. The application-manager software receives a selection as to an application from the user. If the selection is for the SaaS application, the application-manager software provisions the SaaS application. The provision includes automatically logging the user onto an account with a provider of the SaaS application using a single sign-on and connecting the user to the account so that the user can interact with the SaaS application. If the selection is for the thin application, the application manager software launches the thin application.

21 Claims, 26 Drawing Sheets

Related U.S. Application Data continuation of application No. 16/113,975, filed on Aug. 27, 2018, now Pat. No. 10,771,465, which is a continuation of application No. 14/666,051, filed on Mar. 23, 2015, now Pat. No. 10,063,552, which is a continuation of application No. 13/218,631, filed on Aug. 26, 2011, now Pat. No. 8,990,699.

(60) Provisional application No. 61/378,294, filed on Aug. 30, 2010.

(51) Int. Cl.
*G06F 21/41* (2013.01)
*G06F 21/10* (2013.01)
*H04L 67/02* (2022.01)
*H04L 67/10* (2022.01)

(52) U.S. Cl.
CPC .......... *H04L 63/0815* (2013.01); *H04L 67/02* (2013.01); *H04L 67/10* (2013.01)

(56) References Cited

U.S. PATENT DOCUMENTS

| | | |
|---|---|---|
| 8,104,076 B1 | 1/2012 | Lam |
| 8,689,110 B2 | 4/2014 | Verma et al. |
| 8,990,699 B2 | 3/2015 | Pugh et al. |
| 8,990,911 B2 | 3/2015 | Olden et al. |
| 10,063,552 B2 | 8/2018 | Pugh et al. |
| 10,771,465 B2 | 9/2020 | Pugh et al. |
| 11,343,250 B2 | 5/2022 | Pugh et al. |
| 2002/0138577 A1 | 9/2002 | Teng et al. |
| 2007/0239859 A1 | 10/2007 | Wilkinson et al. |
| 2008/0034412 A1* | 2/2008 | Wahl ................ G06F 21/41 726/8 |
| 2008/0059804 A1 | 3/2008 | Shah |
| 2008/0147745 A1 | 6/2008 | Wilkinson et al. |
| 2008/0168539 A1* | 7/2008 | Stein ................ H04L 63/0815 726/5 |
| 2008/0288631 A1 | 11/2008 | Faisal et al. |
| 2009/0089625 A1 | 4/2009 | Kannappan et al. |
| 2009/0249440 A1* | 10/2009 | Platt ................ H04L 63/0815 726/1 |
| 2009/0328186 A1* | 12/2009 | Pollutro ................ G06F 21/335 726/13 |
| 2010/0010894 A1 | 1/2010 | Boyer |
| 2010/0198730 A1* | 8/2010 | Ahmed ................ G06F 21/30 380/278 |
| 2011/0099618 A1 | 4/2011 | Mutt |
| 2011/0252334 A1 | 10/2011 | Verma et al. |
| 2011/0277027 A1* | 11/2011 | Hayton ................ G06F 21/554 726/8 |
| 2011/0313950 A1 | 12/2011 | Nuggehalli et al. |
| 2012/0011518 A1 | 1/2012 | Duan et al. |
| 2013/0067225 A1 | 3/2013 | Shochet |

OTHER PUBLICATIONS

International Search Report and Written Opinion in International Appln. No. PCT/US2011/049174 dated Nov. 21, 2011, 4 pages.

Madden, "VMware Project "Origami:" unifying the server, desktop, and Saas app models?", retrieved from URL <http://www.brianmadden.com/blogs/brianmadden/archive/2010/0 8/25/vmware-project-quotorigami-quot-unifying-the-server-desktop-and-saas-app-models.aspx,> Aug. 25, 2010, 8 pages.

Wikipedia.com "Application streaming", retrieved from the URL <http://en.wikipedia.org/w/index.php?title=Application streaming &oldid=373707909>, retrieved on Nov. 3, 2011, Jul. 15, 2010.

\* cited by examiner

| ⌂ Home | ✉ Email | 📅 Calendar | 📄 Documents | 🔧 Admin | | | Root Admin HELP LOGOUT ⊖ |
|---|---|---|---|---|---|---|---|
| vmware® | Example Company Dev | | | | | 🔍 Search *users, groups and apps...* | Go |
| Dashboard | Users | Groups | Applications | Licenses | Policy | | |

| Users Under Management | SAAS Apps Under Management | Desktop Apps Under Management | GB of Storage Utilized |
|---|---|---|---|
| 5 | 17 | 9 | 4.5 |

⟵ 1001

USERS

| Total Users under management | 5 |
|---|---|
| SAAS Apps under management | 17 |
| Desktop apps under management | 9 |

BANDWIDTH

| Average monthly bandwidth | 139MB |
|---|---|
| Highest daily consumption | 5MB (5/10/2010) |

◉ All Reports
- Most active applications
- Application usage overtime
- Most active users
- Most active locations
- Most recent locations
- System utilization (concept report)
- Cost of license under-usage
- Cost of license over-subscription
- Cost of licenses (table)
- Cost of licenses (chart)

⌂Home | ✉Email | 🗓Calendar | 🗁Documents | ⚙Admin | 🔍 Root Admin HELP | LOGOUT vmware® | Example Company Dev

Search users, groups and apps... [Go]

Dashboard | Users | Groups | Applications | Licenses | Policy

Related Reports
- Most active users
- Most active locations
- Most recent locations All Reports >>

— 1102

12 Users

⊕ Add a User — 1103

| | USERS | USERNAME | GROUPS | ROLE |
|---|---|---|---|---|
| ☐ | Admin, Root | root | | Admin |
| ☐ | Dilsaver, Darius | ddilsaver | | Admin |
| ☐ | Angold, Martin | mangold | | Admin |
| ☐ | Larzazs, Carey | clarzazs | | Admin |
| ☐ | Vilchis, Deslie | dvilchis | | Admin |
| ☐ | One, Admin | admin1 | | Admin |
| ☐ | Two, Admin | admin2 | | Admin |
| ☐ | Gorman, Regis | rgorman | Company X | User |
| ☐ | Holtry, Martin | mholtry | | User |
| ☐ | Jetson, Sven | sjetson | | User |
| ☐ | Lindbom, Lars | llindbom | | User |
| ☐ | Anderson, Greg | ganderson | | User |

Previous | 1-12 of 12 | Next

🏠 Home | ✉ Email | 📅 Calendar | 📄 Documents | 👤 Admin vmware® | Example Company Dev

👤 Root Admin
HELP | LOGOUT

[ Dashboard | Users | Groups | Applications | Licenses | Policy ]

Search users, groups and apps... [ Go ]

3 Groups

| | NAME | NO. OF USERS | NO. OF APP ENTITLEMENTS |
|---|---|---|---|
| ☐ | Company X | 1 | 12 |
| ☐ | Sales | 0 | 0 |
| ☐ | Finance | 0 | 0 |

⊕ Add a Group — 1303

Related Reports
- Most active users
- Most active locations
- Most recent locations All Reports >> — 1302

| | NAME/DESCRIPTION | TYPE | LICENSE REQUIRED |
|---|---|---|---|
| ☐ | Accept360 Product requirements | Bookmark | ⊙ 1 of 100 total licenses being used |
| ☐ | Adobe Reader 9 PDF reader (private) | RemoteApp | |
| ☐ | ADP Employee Self Service | Bookmark | |
| ☐ | Axiom Travel | Bookmark | ⊙ License required |
| ☐ | Box.net Collaborative suite | Box.net | ⊙ License required |
| ☐ | Citibank VMware credit card tracking | Bookmark | |
| ☐ | Excel 2007 Spreadsheet (private) | RemoteApp | |
| ☐ | Google Apps Collaborative office software | Google Apps | ⊙ 0 of 2000 total licenses being used |
| ☐ | Microsoft Visio Diagramming (public) | RemoteApp | |
| ☐ | Microsoft Word Create, edit, and access documents | Native | |
| ☐ | Mozy Cloud Backup | Mozy | |
| ☐ | MS paint pixel editor (public) | RemoteApp | ⊙ 3 of 50 total licenses being used |
| ☐ | Netsuite Business management SaaS | Bookmark | |
| ☐ | Photoshop General editing | Native | |

☆Home | ✉Email | 🗓Calendar | 🗂Documents | ✏Admin | 🔍 Search users, groups and apps... | Go | Root Admin HELP | LOGOUT vmware® | Example Company Dev Dashboard | Users | Groups | Applications | Licenses | Policy Licenses

| APPLICATION | QUANTITY | COST PER USER |
|---|---|---|
| Netsuite | 50 | $100.00 |
| Quicken | 100 | $970.00 |
| Workday | 10,000 | $10.00 |
| PMT | 10,000 | $0.00 |
| Photoshop | 20 | $700.00 |
| Google Apps | 2,000 | $60.00 |
| Accept360 | 100 | $66.00 |

⊙ Related Reports
- Cost of license under-usage
- Cost of license over-subscription
- Cost of license (table)
- Cost of license (Chart)

All Reports >>

UNIFIED WORKSPACE FOR THIN, REMOTE, AND SAAS APPLICATIONS

CLAIM OF PRIORITY

This application is a continuation and claims the benefit of U.S. patent application Ser. No. 16/994,111, entitled "Unified Workspace for Thin, Remote, and SAAS Applications", filed on Aug. 14, 2020, which is a continuation and claims the benefit of U.S. patent application Ser. No. 16/113,975, entitled "Unified Workspace for Thin, Remote, and SAAS Applications", filed on Aug. 27, 2018, which is a continuation and claims the benefit of U.S. patent application Ser. No. 14/666,051, entitled "Unified Workspace for Thin, Remote, and SAAS Applications", filed on Mar. 23, 2015, which is a continuation and claims the benefit of U.S. patent application Ser. No. 13/218,631, entitled "Unified Workspace for Thin, Remote, and SAAS Applications", filed on Aug. 26, 2011, which is a utility conversion and claims the benefit of U.S. Provisional Patent Application No. 61/378,294, entitled "Unified Workspace for Desktop Applications, Software as a Service (SaaS) Applications, and Data", filed on Aug. 30, 2010. The disclosure of these applications are hereby incorporated by reference.

RELATED APPLICATION

This application is related to U.S. Pat. No. 7,779,091, entitled "Method And System For Providing Virtualized Application Workspaces", which issued on Aug. 17, 2010. The disclosure of that application is also hereby incorporated by reference.

BACKGROUND

In the context of deploying software applications at the enterprise level, the term "entitlement" refers to the process of determining if a user is permitted access to an application, e.g., according to a licensing arrangement or a company policy. The term "provisioning" refers to the process of actually giving a user an application, or making it accessible to the user. Provisioning generally occurs only after entitlement has been determined.

Traditionally, desktop-application entitlement and provisioning was accomplished by running an installer program or script to install an application on a computing system (e.g., a hardware device with platform software) associated with a user who has a license/permission to use the application. Often, such an installation can be automated.

Some applications, referred to herein as "thin applications," do not require a full-blown installation (e.g., including registry settings) on the user's computing system and can run from a simple executable file that merely needs to be copied to the user's disk. For example, thin applications include many virtualized applications, such as those virtualized using ThinApp™, available from VMware, Inc. of Palo Alto, Calif. Similarly, other applications may be accessed remotely over a network, and need very little, if any, customization of the user's device. For example, applications may be accessed remotely using a virtual desktop infrastructure (VDI) solution, such as VMware View™, a desktop-remoting system that includes a thin client accessed directly by a user, which remotes to a desktop from a remote virtual machine. In another example, a terminal server hosting user applications may be accessed using a browser or other thin client.

Likewise, software as a Service (SaaS) applications, by their nature as cloud-based applications, generally do not require installation or modification of the user's system or device. SaaS applications are generally web-based, e.g., accessed and used through a web browser. This simplifies provisioning, but can complicate both authentication and entitlement enforcement. For a SaaS application, a user typically authenticates with the SaaS provider, e.g., by providing a user identifier and password combination, before the SaaS will connect the user to his/her account and grant access to a particular application.

As software development shifts away from traditional applications to virtualized applications, remote applications, and SaaS applications, a need arises for a centralized approach to managing the entitlement and provisioning of such applications on a growing number of client devices that use a growing number of access channels (e.g., mobile devices such as smartphones that use Wi-Fi networks).

SUMMARY

In an example embodiment, a processor-executed method is described for providing applications to a user. According to the method, application-manager software authenticates a user of a client device over a channel. The authentication operation is performed using a directory service. The application-manager software presents a plurality of applications in a graphical user interface (GUI) displayed by the client device. The plurality of applications depends at least in part on the authentication, the client device, and the channel. And the plurality of applications includes a thin application and a software-as-a-service (SaaS) application. The application-manager software receives a selection as to an application from the user. If the selection is for the SaaS application, the application-manager software provisions the SaaS application. The provision includes automatically logging the user onto an account with a provider of the SaaS application using a single sign-on and connecting the user to the account so that the user can interact with the SaaS application. If the selection is for the thin application, the application manager software launches the thin application.

In another example embodiment, an apparatus is described, namely, a computer-readable storage medium that persistently stores a program for providing applications to a user. The program authenticates a user of a client device over a channel. The authentication operation is performed using a directory service. The program presents a plurality of applications in a GUI displayed by the client device. The plurality of applications depends at least in part on the authentication, the client device, and the channel. And the plurality of applications includes a thin application and a software-as-a-service (SaaS) application. The program receives a selection as to an application from the user. If the selection is for the SaaS application, the program provisions the SaaS application. The provision includes automatically logging the user onto an account with a provider of the SaaS application using a single sign-on and connecting the user to the account so that the user can interact with the SaaS application. If the selection is for the thin application, the program launches the thin application.

Another example embodiment also involves a processor-executed method for providing applications to a user. According to the method, application-manager software authenticates a user of a client device over a channel. The authentication operation is performed using a directory service. The application-manager software presents a plurality of applications in a GUI displayed by the client device.

The plurality of applications depends at least in part on the authentication, the client device, and a geolocation of the client device. And the plurality of applications includes a sandboxed application and a software-as-a-service (SaaS) application. The application-manager software receives a selection as to an application from the user. If the selection is for the SaaS application, the application-manager software provisions the SaaS application. The provision includes automatically logging the user onto an account with a provider of the SaaS application using a single sign-on and connecting the user to the account so that the user can interact with the SaaS application. If the selection is for the sandboxed application, the application manager software launches the sandboxed application.

Other aspects and advantages of the inventions will become apparent from the following detailed description, taken in conjunction with the accompanying drawings, which illustrate by way of example the principles of the inventions.

BRIEF DESCRIPTION OF THE DRAWINGS

FIG. 10 shows a GUI view of a dashboard tab displayed by an administrator web portal, in accordance with an example embodiment.

FIG. 11 shows a GUI view of a users tab displayed by an administrator web portal, in accordance with an example embodiment.

FIG. 12 shows a GUI view of a user edit dialog displayed by an administrator web portal, in accordance with an example embodiment.

FIG. 13 shows a GUI view of a groups tab displayed by an administrator web portal, in accordance with an example embodiment.

FIG. 14 shows a GUI view of a group edit dialog displayed by an administrator web portal, in accordance with an example embodiment.

FIG. 16 shows a GUI view of an applications tab displayed by an administrator web portal, in accordance with an example embodiment.

FIG. 19 shows a GUI view of an edit dialog for editing a published (or remote) application, in accordance with an example embodiment.

FIG. 20 shows a GUI view of a licenses tab displayed by an administrator web portal, in accordance with an example embodiment.

DETAILED DESCRIPTION

In the following description, numerous specific details are set forth in order to provide a thorough understanding of the exemplary embodiments. However, it should be noted that the example embodiments described herein may be practiced without some of these specific details. In other instances, process operations and implementation details have not been described in detail where they are already well known.

Generally speaking, the example embodiments described herein provide a unified workspace for desktop (both local and remote) applications, software-as-a-service (SaaS) applications, and data. End users are provided with a single workspace that works across various client devices to access applications, while providing administrators a single place for managing application entitlement and provisioning.

Figure 1:
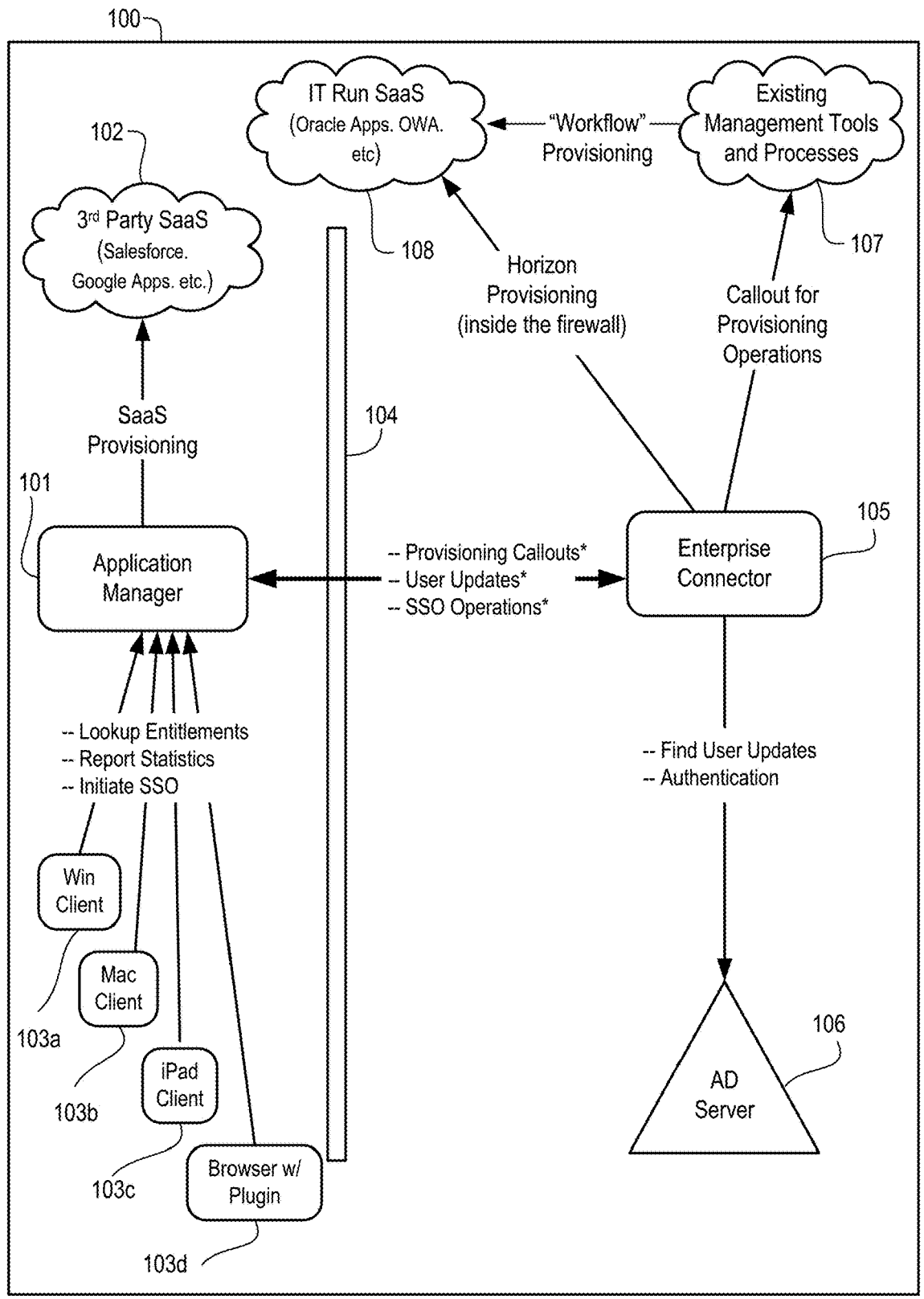
FIG. 1 is a simplified system diagram that illustrates an architecture for a system for managing authentication, entitlements, and provisioning, in accordance with an example embodiment.

FIG. 1 is a simplified system diagram that illustrates an architecture for a system 100 for managing authentication, entitlements, and provisioning, in accordance with an example embodiment. As depicted in this figure, the system includes an Application Manager 101, which, among other things, allows: (1) administrators to connect (e.g., through an administrator portal) to manage users, applications and accounts; (2) end users to connect (e.g., through a user portal), where they can (a) launch applications, in a relatively seamless manner, or (b) enable and disable applications to which they are entitled; and (c) employ client devices to connect through a RESTful API and to get lists of application entitlements per user/device. It will be appreciated that "REST" is an acronym for "Representational State Transfer" and "API" is an acronym for "application programming interface." It will further be appreciated that a RESTful API typically supports HTTP (hypertext transfer protocol) operations (e.g., POST, GET, PUT or DELETE) on an Internet media type (e.g., JSON (JavaScript Object Notation), XML (eXtensible Markup Language), or YAML).

As depicted in FIG. 1, Application Manager 101 communicates (e.g., over a network which may include the Internet or other WAN) with 3$^{rd}$ Party SaaS 102, which are SaaS application providers (such as Salesforce.com, Google, etc.) supported by the system. Application Manager 101 can provision new user accounts with 3$^{rd}$ Party SaaS 102 and provide single sign-on (SSO). In an example embodiment, 3$^{rd}$ Party SaaS 102 might have a provisioning API and/or support SAML (Security Assertion Markup Language). SAML is a well-known standard for enabling SSO authentication. For 3rd Party SaaS 102 providers that do not support SAML or have a provisioning API, Application Manager 101 might provide down-level screen scraping APIs to enable the provisioning of new user accounts.

As further depicted in FIG. 1, Application Manager 101 communicates (e.g., over the Internet or other WAN which might be wireless in whole or in part) with supported client devices, including, by way of example without limitation: (1) Windows Client 103a (e.g., with a platform including an Intel x86-family microprocessor running a Microsoft Windows® operating system); (2) Mac Client 103b (e.g., with a platform including an Intel x86-family microprocessor running a Mac™ OS operating system); and (3) iPad® Client 103c (e.g., with a platform including an ARM microprocessor running an iOS™ operating system). In an example embodiment, this communication takes place through calls by native agents on the supported client devices to the RESTful API described above. For example, a native agent might periodically use the RESTful API to transmit device configuration information relating to: (a) the client device's operating system (and patches); (b) whether virus protection/firewall/anti-spyware is installed; (c) the domain to which the client device is attached; and (c) whether auto-updates are installed. In response, the native agent would receive a list of entitlements from Application Manager 101. Then the native agent would compare the entitlements to what is currently installed and execute the appropriate install, upgrade, and/or uninstall operations.

For thin applications and native applications, installing might entail installing an MSI (Windows Installer). For remote applications, installing might entail setting up the RDP (Remote Desktop Protocol). For SaaS applications, installing might entail setting up a URL shortcut to the application. The shortcut may be installed to the user's desktop and appear as an icon that can be activated by double-clicking. The URL (Uniform Resource Locator) for this shortcut will launch the user's browser to access Application Manager 101, with a redirect portion of the URL for the SaaS application. More specifically, when a user clicks on the SaaS shortcut, the URL of the shortcut will direct to Application Manager 101 to initiate an SSO connection. After the SSO session is created, the Application Manager 101 will redirect user's browser to the 3$^{rd}$ Party SaaS 102 with the appropriate authentication information as specified by the SAML IdP-initiated SSO profile.

As also depicted in FIG. 1, Application Manager 101 can also communicate with web browser 103d (e.g., a browser which supports HTML5, Adobe Flash, etc.). In an example embodiment, the system provides a user portal that can be accessed directly by a web browser with a system plug-in, rather than a native agent. The functionality included in such a system plug-in might, for example: (1) enable SSO for down-level SaaS applications that do not support SAML (or any other standard for an ID protocol); and (2) provide metrics to the system on SaaS application usage and/or geolocation for reporting to administrators. Here it will be appreciated that geolocation information might be obtained from a client device through the use of the W3C Geolocation API or a similar API in a web browser, in an example embodiment.

Additionally, FIG. 1 depicts Application Manager 101 communicating across firewall 104 with Enterprise Connector 105. In an example embodiment, Enterprise Connector 105 might initiate a secure connection to Application Manager 101 so that Application Manager 101 can send commands to Enterprise Connector 105. Also, Enterprise Connector 105 might be a virtual appliance, in an example embodiment. Enterprise Connector 105 provides a bridge into the enterprise for integration with existing corporate processes and directories. To prevent companies from having to open holes in their firewall, Enterprise Connector 105 is installed behind firewall 104 and is connected to the Application Manager 101, e.g., using a secure connection or using a local area network (LAN) or wide area network (WAN) which might be wireless in whole or in part, but which employs security measures to vouch for identity. An example of such a security measure is a certificate installed on Enterprise Connector 105 and registered with Application Manager 101, so that Application Manager 101 can verify the identity of Enterprise Connector 105.

In an example embodiment, Enterprise Connector 105 might act as an Identity Provider (IdP) for SSO. In this capacity, Enterprise Connector 105 might provide authentication against an internal LDAP (Lightweight Directory Access Protocol) server such as Active Directory ("AD") Server 106, without exposing passwords. It will be appreciated that in such an embodiment, AD Server 106 is the "source of truth" for corporate user identity and as such receives and reports updates to corporate user identity. In an alternative example embodiment where Enterprise Connector 105 is absent, Application Manager 101 might directly connect, using a connection which is secure or which employs security measures to AD Server 106, when performing authentication and operations involving user updates.

Additionally, Enterprise Connector 105 might act as a staging area behind firewall 104 for integrating with existing workflow and licensing processes. In this capacity, Enterprise Connector 105 might make provisioning callouts to existing management tools and processes 107, using, for example, custom workflows built on WS-BPEL (Web Services Business Process Execution Language) or built into management tools. When making these provisioning callouts, Enterprise Connector 105 will utilize information from existing license tracking systems, asset management systems, etc.

Similarly, Enterprise Connector 105 might perform SaaS provisioning inside firewall 104, using SAML or provisioning APIs exposed by IT Run SaaS 108. IT Run SaaS 108 might include SaaS applications such as Oracle Apps, Outlook Web App (OWA), etc. In an example embodiment, some or all of these internal SaaS applications might not be provisioned against AD Server 106.

Enterprise Connector 105 may allow extensions to system 100 for supporting additional applications. For example, a user of system 100 might want to use Jira®, an issue and project tracking application available from Atlassian Pty Ltd. of Sydney, Australia, but system 100 does not provide drivers to support such use. In this scenario, the user may create their own drivers and install them, e.g., as plugins or extensions, in Enterprise Connector 105. The drivers will then run as part of any provisioning operation involving Jira.

In an example embodiment, the system depicted in FIG. 1 might run on a number of servers connected by a network (e.g., a LAN or a WAN) to each other in a cluster or other distributed system which might execute distributed-computing software (including Apache's Hadoop or other software based on Map-Reduce and/or Google File System), virtualization software (e.g., as provided by VMware, Citrix, Microsoft, etc.), load-balancing software, database software (e.g., SQL, NoSQL, etc.), web server software, etc. In turn, the distributed system might be connected (e.g., by a storage area network (SAN)) to persistent storage which stores (e.g., in a database or other file) data related to authentication, entitlements, and provisioning. The servers themselves might include: (1) hardware consisting of one or more microprocessors (e.g., from the x86 family), volatile storage (e.g., RAM), and persistent storage (e.g., a hard disk or solid-state drive); and (2) an operating system (e.g., Linux, Windows Server, Mac OS Server, etc.) that runs on the hardware.

Figure 2:
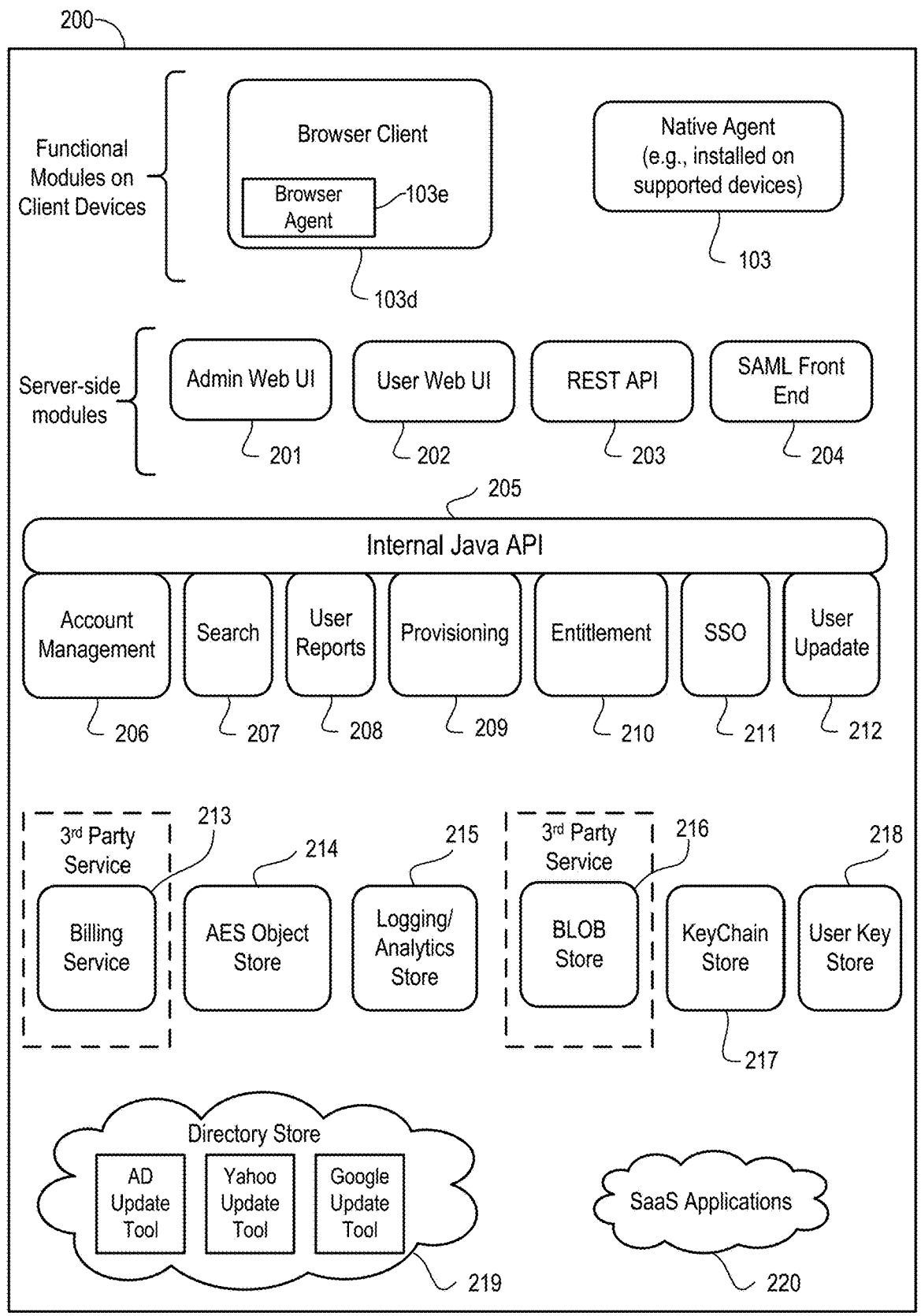
FIG. 2 shows a diagram of the functional modules in a system for managing authentication, entitlements, and provisioning, in accordance with an example embodiment.

FIG. 2 shows a diagram of the functional modules in a system 200 for managing authentication, entitlements, and provisioning, in accordance with an example embodiment. As depicted in this figure, two of the functional modules reside on client devices: (1) the browser plug-in (or agent) 103e, which interfaces with a web browser 103d and that reports usage to RESTful API 203 for logging and reporting by the system as described above; and (2) the native agent (or client) 103, also described above, which is installed on a client device with an x86 platform (e.g., a Windows or Mac laptop or desktop) or an ARM platform (e.g., an iPhone, an iPad, an Android smartphone, an Android tablet, etc.).

As depicted in FIG. 2, the server-side modules of the system include four modules that interface with the client-side modules. One of these modules is the Administrative Web UI (user interface) 201, where administrators can go to manage, among other things: (1) applications and application families (e.g., where a "family" is an arbitrary group of applications that may be managed as a unit, as opposed to a family of different versions of a single application); (2) end users; (3) client devices and policies related to client devices; and (4) entitlements. Also, administrators might be able to view reports on usage and/or geolocation at Administrative Web UI 201, in an example embodiment. Elsewhere in the disclosure, Administrative Web UI 201 is called the "administrator web portal".

Further, as depicted in FIG. 2, the server-side modules of the system include a User Web UI 202 where users can go to launch applications in a relatively seamless manner and enable disabled applications they are entitled to. Also, the system's server-side modules include a RESTful API 203, which may include a set of APIs and provides access to some or all of the system's functionality, depending on how the system is implemented and/or configured. In an alternative example embodiment, the system's functionality might be accessed in whole or in part using the SOAP (Simple Object Access Protocol) protocol or some other protocol for inter-process communication. Elsewhere in the disclosure, User Web UI 201 is called the "user web portal".

As additionally depicted in FIG. 2, the server-side modules of the system include a SAML Front End 204, which understands SAML and which creates the SAML session, using SSO Service 211, to perform most of the actual work related to SSO authentication.

Beneath the four server-side modules that interface with the client-side modules is an Internal Java API 205 which server-side modules 201-204 use to communicate and to access the server-side modules that provide back-end functionality. The Internal Java API 205 might log all of its API calls to the Logging/Analytics Store 215, in an example embodiment. This information might then be used for generating user reports on usage and/or geolocation.

The server-side modules that provide back-end functionality include a module 206 for account management which provides an API for purchasers of the system to interact with the entity distributing the system (i.e., VMware). The server-side modules that provide back-end functionality also include a search module 207 which provides a search interface for searching the objects in the Application Entitlement Store (AES) Object Store 214. In an example embodiment, the objects in the AES Object Store 214 might be indexed in a Solr index in preparation for searching. Solr is an open-source enterprise search platform from the Apache Lucene project.

Another server-side module that provides back-end functionality is module 208 for user reports. Module 208 creates reports for administrators. In an example embodiment, module 208 will retrieve data for the reports from Logging/Analytics Store 215 and AES Object Store 214, among other places. The reports might cover licenses, application usage, access location (e.g., geolocation), devices by user and/or type and/or configuration, etc. In an example embodiment, the reports from Logging/Analytics Store 215 might be created using Apache's Hadoop (e.g., Hadoop jobs). Also in an example embodiment, the reports might generate cubes, such as OLAP (online analytical processing) cubes, where the cubes might have dimensions for, among other things: (a) user; (b) group/tag; (c) application; (d) date/time; and (e) device type. It will be appreciated that each of these dimensions might not be generated in the same cube for the same report. In an example embodiment, a user report might also include metrics related to the number of application provisions, usage time, usage time at a location, number of logins, etc.

The server-side modules that provide back-end functionality include module 209 for provisioning. In an example embodiment, module 209 might have custom logic (or provisioning drivers) for different types of applications. For example, for SaaS applications 220, the provisioning driver might operate according to the process defined in Table 1.

TABLE 1

If the SaaS application supports JIT (Just In Time) provisioning,
    Then do nothing.
If the SaaS supports Service Provisioning Markup Language (SPML) or another provisioning API,
    Then call that API.
    Otherwise, do form stuffing to automatically provision the SaaS application.

For example, since Salesforce's SaaS employs JIT provisioning, when a user attempts to access the Salesforce SaaS application, Salesforce will contact the system for an immediate provisioning decision.

Form stuffing is used for authentication for SaaS applications 220 when the SaaS provider does not support SAML (or another SSO scheme). That is to say, module 209 sets a password during provisioning. In an example embodiment, the passwords might be randomly generated, so that compromising a single password will not compromise the system. The user may be prevented from accessing the password. By not providing the password to the user, the system prevents the user from going to a SaaS application without using a system agent.

For thin applications and/or native applications, the provisioning driver might (1) perform any licensing accounting and (2) make the application available for download. For remote applications, the provisioning driver might (1) perform any licensing accounting and (2) retrieve related files, e.g., Remote Desktop Protocol (RDP) files, VMware View™ files, etc. In an alternative example embodiment, some or all of these operations might be performed by existing workflow and licensing processes (e.g., in response to provisioning callouts as described above).

It will be appreciated that in an example embodiment, the thin application might be a virtualized application such as a VMware ThinApp™, which provides a sandbox to hold runtime modifications to, for example, the registry and/or file system made by an application. It will further be appreciated that such a sandbox is useful to prevent overwritten DLLs (dynamically linked libraries), among other things. Similarly, in an example embodiment, the remote application might be a desktop virtualization application such as a VMware View application which runs on a guest operating system on a virtual machine provided by a virtualization layer (e.g., a hypervisor) on a remote server.

Further, in an example embodiment, the provisioning driver for an application might support the following operations: (1) add/remove a user; and (2) get user status. Typically, the add/remove operation will be performed once per user. If the application is a SaaS application, the provisioning driver might add a user by associating the user's credentials with an account previously obtained by an administrator from a SaaS provider. If the application is a thin application or a remote application, the provisioning driver might add the user by performing any licensing accounting.

It will be appreciated that the retrieved user status might be used to determine variances between the expected provision state and the actual provision state of a user of a SaaS application.

As also depicted in FIG. 2, the server-side modules that provide back-end functionality include module 210 for entitlements. In an example embodiment, this module controls access to the system's applications based on entitlements. In an example embodiment, an entitlement might be represented by as a tuple with elements such as <user, device, application, set of user tags, device configuration, authentication type>.

Among other things, the entitlements determine which application shortcuts (e.g., as represented by icons) are presented on the GUI desktop displayed by native client 103. Similarly, these entitlements will be checked to determine which application shortcuts (e.g., as represented by icons) are presented in the GUI displayed by User Web UI 202. Additionally, for each SSO operation against an application, module 210 checks the entitlement to verify that the SSO can proceed and to set a session timeout. When entitlements change, module 210 determines whether any provisioning/de-provisioning operations should be performed and whether any SSO sessions should be closed.

Another server-side module that provides back-end functionality is module 211 for SSO. In an example embodiment, module 211 keeps track of authentication sessions that are shared across different applications. It will be appreciated that initiation of a session involves user authentication. In an example embodiment, if the user is inside the firewall 104, authentication might take place against AD Server 106 (or other directory service), by going through Enterprise Connector 105. If the user is outside firewall 104, authentication might take place against AD Server 106 (or other directory service), by going through both Application Manager 102 and Enterprise Connector 105. Alternatively, the system might delegate authentication to an SaaS provider (e.g., Google Apps) or other provider (e.g., Yahoo!) that provides hosted identity and which is accessed using SAML or OAuth (Open Authorization).

In other instances, authentication might not involve a directory. That is to say, authentication might occur through SAML. Or for down-level applications, authentication might be handled by form stuffing as described above, which might request a username and/or password from a user through a GUI in web browser 103d.

The server-side modules that provide back-end functionality also include module 212 for user update. This module updates user data based on changes, for example: (1) resulting from operations performed through Administrator Web UI 201; (2) coming from RESTful API 203; or (3) propagated from Directory Store 219 through a synchronization tool, e.g., an AD update tool, a Yahoo! update tool, a Google update tool, etc.

Another server-side module that provides back-end functionality is Billing Service 213, which is might be an automated third-party service that performs the accounting or verification of accounting for licensing charges/payments for applications provisioned by the system. In an example embodiment, the system might access Billing Service 213 using an API.

The server-side modules that provide back-end functionality also include AES Object Store 214. In example embodiment, AES Object Store 214 is a scalable object store that stores the system's objects (e.g., related to users, applications, groups, application families, entitlements, account activations, etc.) in a database. It will be appreciated that the rest of the system works with versions of these objects using transactions semantics. In an example embodiment, AES Object Store 214 provides optimistic concurrency and atomic operations. Also, in an example embodiment, AES Object Store 214 might be distributed among several databases on the basis of enterprise organizational structure.

Another server-side module that provides back-end functionality is Logging/Analytics Store 215. In an example embodiment, Logging/Analytics Store 215 might provide scalable persistent storage (e.g., in the form of logs) for: (1) API calls; (2) provisioning operations; and (3) application usage data (e.g., received from a native client or browser plug-in). Logging/Analytics Store 215 also provides a job interface which allows User Reports 208 to run analytics on the logs and generate reports and cubes.

The server-side modules that provide back-end functionality also include BLOB Store 216, Key Chain Store 217, and User Key Store 218. BLOB Store 216 stores images for native applications, thin applications, etc. As indicated in FIG. 2, BLOB Store 216 might be provided by a third party. In an example embodiment, the system might access BLOB Store 216 using an API. Key Chain Store 217 stores the encrypted passwords used in down-level authentication. And User Key Store 218 stores the per-user keys used to decrypt the encrypted passwords in Key Chain Store 217.

It will be appreciated that in an example embodiment, the server-side modules described above might be part of the Application Manager 101 described. In an alternative example embodiment, some of the server-side modules described above might instead be part of the Enterprise Connector 105, if it is installed. Or the functionality in the server-side modules might be relocated to client-side modules and vice versa. That is to say, the modules described above can be distributed throughout the system in any suitable way.

TABLE 2

|  | Type 1 Enterprise | Type 1 (Variant) | Type 2 Enterprise |
|---|---|---|---|
| Modern SaaS App | User inside firewall 2 STSes SAML to App | User outside firewall 1 STSes SAML to App | No firewall 1 STS Proprietary connector to Id Store SAML to App |
| Legacy SaaS App | 1 STS HTTP Fed to App | No STS Native auth to store HTTP Fed to App | No STS Native auth to store HTTP Fed to App |

Figure 3A:
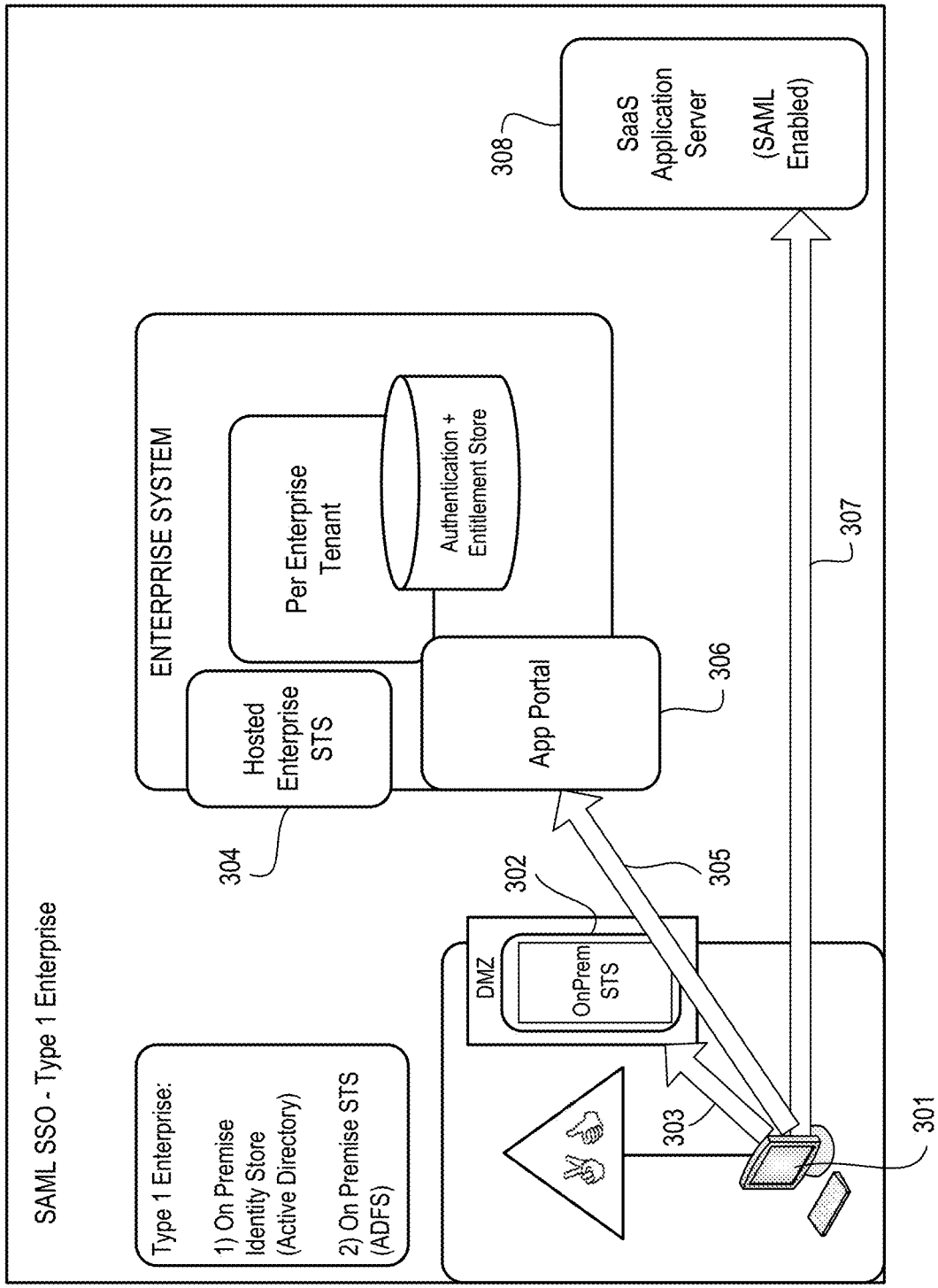
FIG. 3A is a sequence diagram depicting a scenario for SSO, in accordance with an example embodiment.

Table 2 illustrates various scenarios for SSO, in accordance with an example embodiment. It will be appreciated that these scenarios are intended to illustrative rather than limiting. In the first scenario in the column Type 1 Enterprise and in the row Modern SaaS App, the user is inside the firewall but there are two secure token services (STSs), e.g., the application manager server does not have a secure connection into the firewall. This scenario is depicted in FIG. 3A, where STS 302 is onsite (e.g., Active Directory Federation Service (ADFS) in the DMZ) and can authenticate the user to an AD server and create a SAML token. This is shown as operation 303 in FIG. 3B, between client device 301 and STS 302. The other STS, STS 304, can create a SAML token based on an open session using the SAML token created by STS 302. This is shown in operation 305 in FIG. 3B, between client device 301 and application portal 306 (e.g., the user web portal described above). As depicted in operation 307 in that figure, the client device 301 then uses the SAML token created by STS 304 to connect to a modern (SAML-enabled) SaaS application server 308 and gain access to an SaaS application.

In the second scenario, described in the column Type 1 Enterprise and the row Legacy SaaS App of Table 2, there is only one STS. For example, the application manager server may have a secure connection into the firewall. The STS is on an application manager server, which can authenticate the user to an AD server and which proxies a connection between the client device and the legacy SaaS application server using HTTP Federation (HTTP Fed). It will be appreciated that in this instance, the application manager server performs authentication on behalf of the user using a traditional username-password combination. In an alternative example embodiment, the system might also use HTTP Fed with an SAML-enabled SaaS application server, in any of the scenarios described in the table.

Figure 3B:
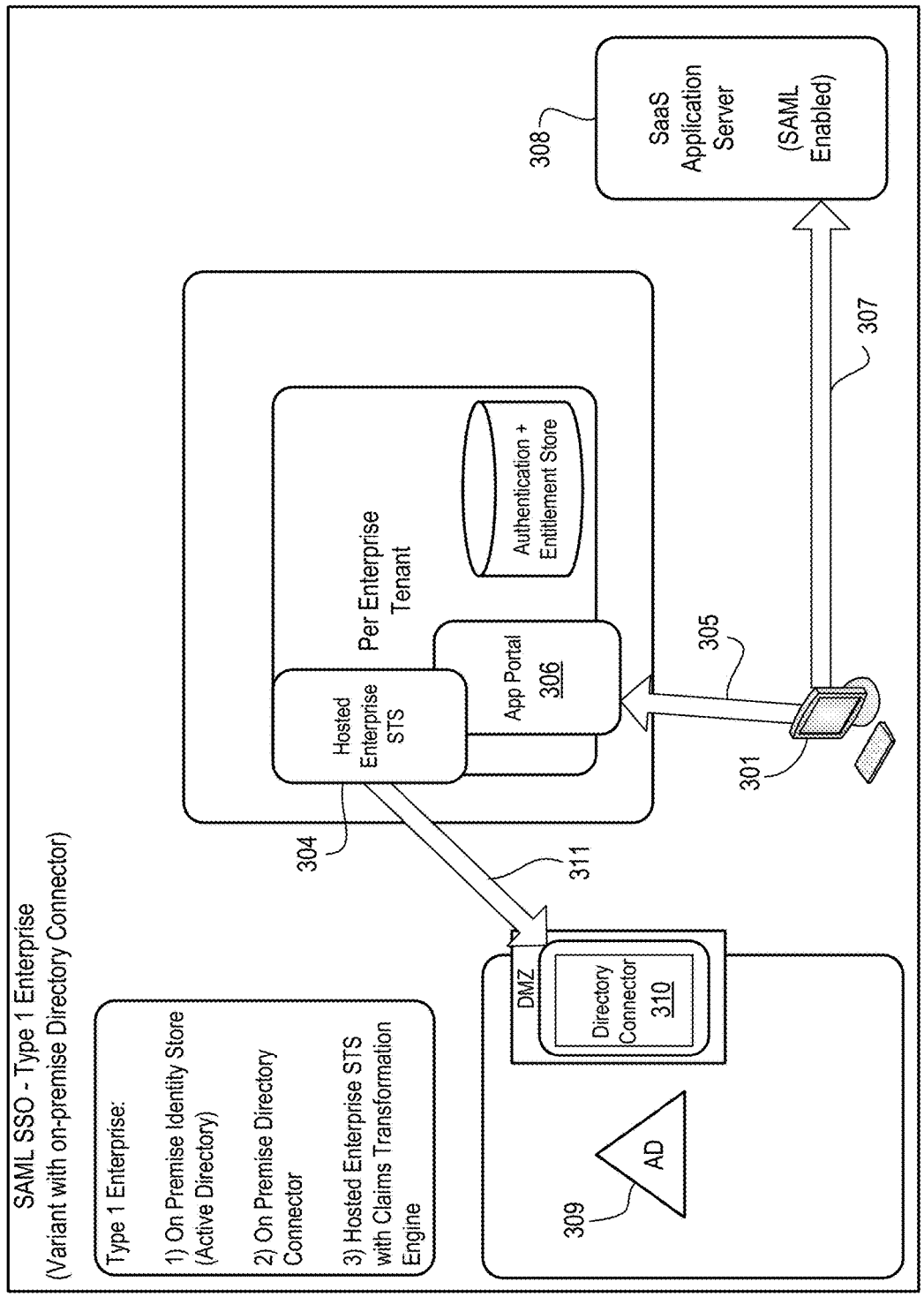
FIG. 3B is a sequence diagram depicting another scenario for SSO, in accordance with an example embodiment.

In the third scenario, described in the column Type 1 Variant and in the row Modern SaaS App of Table 2, the user is outside the firewall and there is only one STS, e.g., the application manager server has a secure connection into the firewall. This scenario is depicted in FIG. 3B, wherein an application manager server includes STS 304 which can authenticate the user to an AD server 309 through the use of directory connector 310 (e.g., AD Connector in the DMZ), such as the Enterprise Connector 105 described above, and create a SAML token. This is shown in operation 305, between client device 301 and application portal 306 (e.g., the user web portal described above), and operation 311, between STS 304 and directory connector 310. Then as depicted in operation 307 in that figure, the client device uses that SAML token to connect to a SAML-enabled SaaS application server 308 and gain access to an SaaS application.

In the fourth scenario, described in the column Type 1 (Variant) and in the row Legacy SaaS App of Table 2, there is no STS and a native authorization is made to the application manager. The authentication manager can then authenticate the user to an identity store on premises and which proxies a connection between the client device and the legacy SaaS application server using HTTP Federation (HTTP Fed). As indicated in the table, this same scenario occurs in cell 6 in the column Type 2 Enterprise and the row Legacy SaaS App.

Figure 3C:
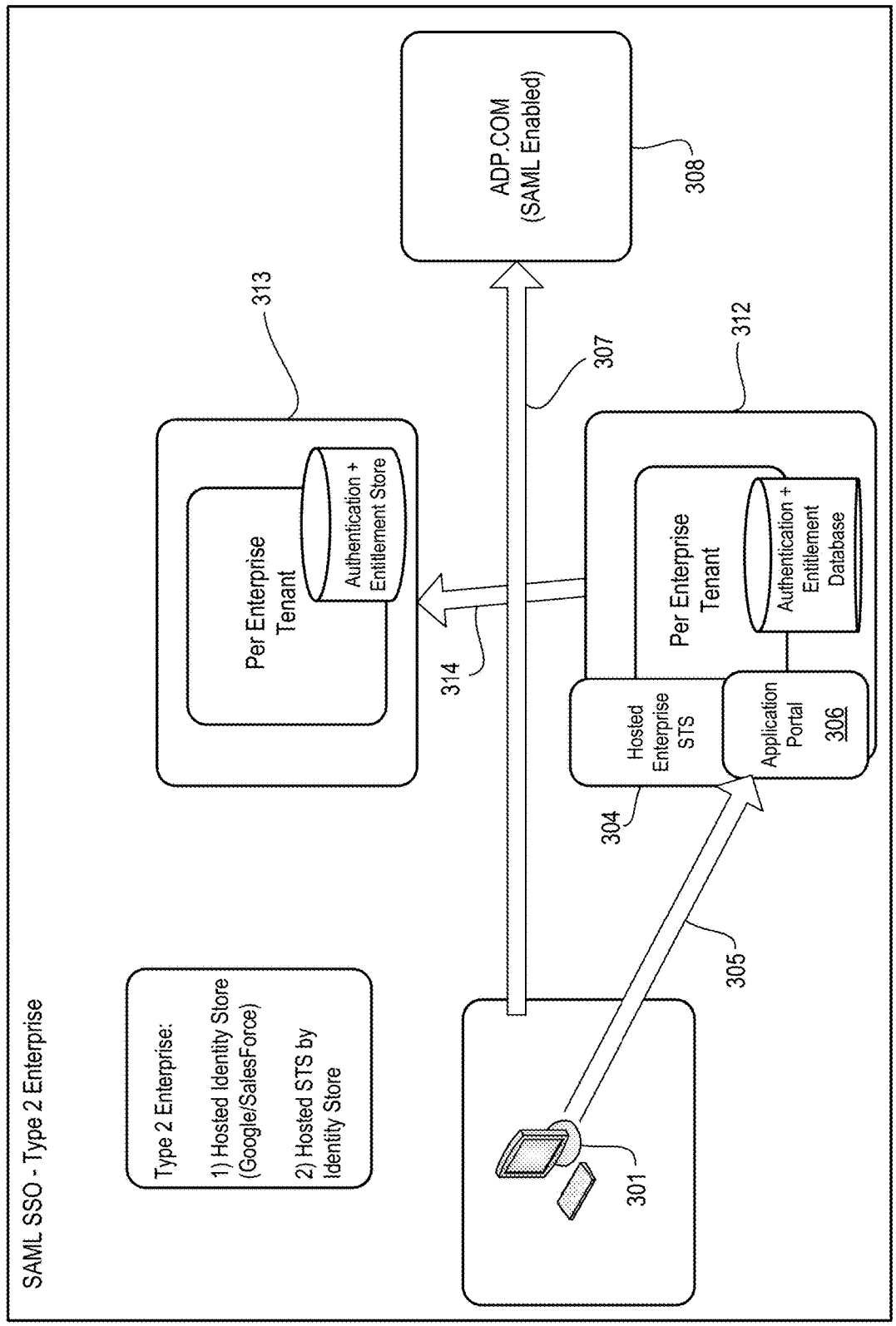
FIG. 3C is a sequence diagram depicting another scenario for SSO, in accordance with an example embodiment.

In the fifth scenario, described in the column Type 2 Enterprise and in the row Modern SaaS App of Table 2, there is no firewall and one STS. This scenario is depicted in FIG. 3C, wherein an application manager server includes STS 304 which can authenticate the user to an identity store and create a SAML token from a SAML token created by a hosted identity store (e.g., at Google or Salesforce) accessed using a proprietary connector. This is shown in operation 305, between client device 301 and application portal 306 (e.g., the user web portal described above), and operation 314, between application manager 312 and hosted-identity manager 313. The client device 301 then uses that SAML token to connect to a SAML-enabled SaaS application server 308 and gain access to a SaaS application, in operation 307.

Figure 4:
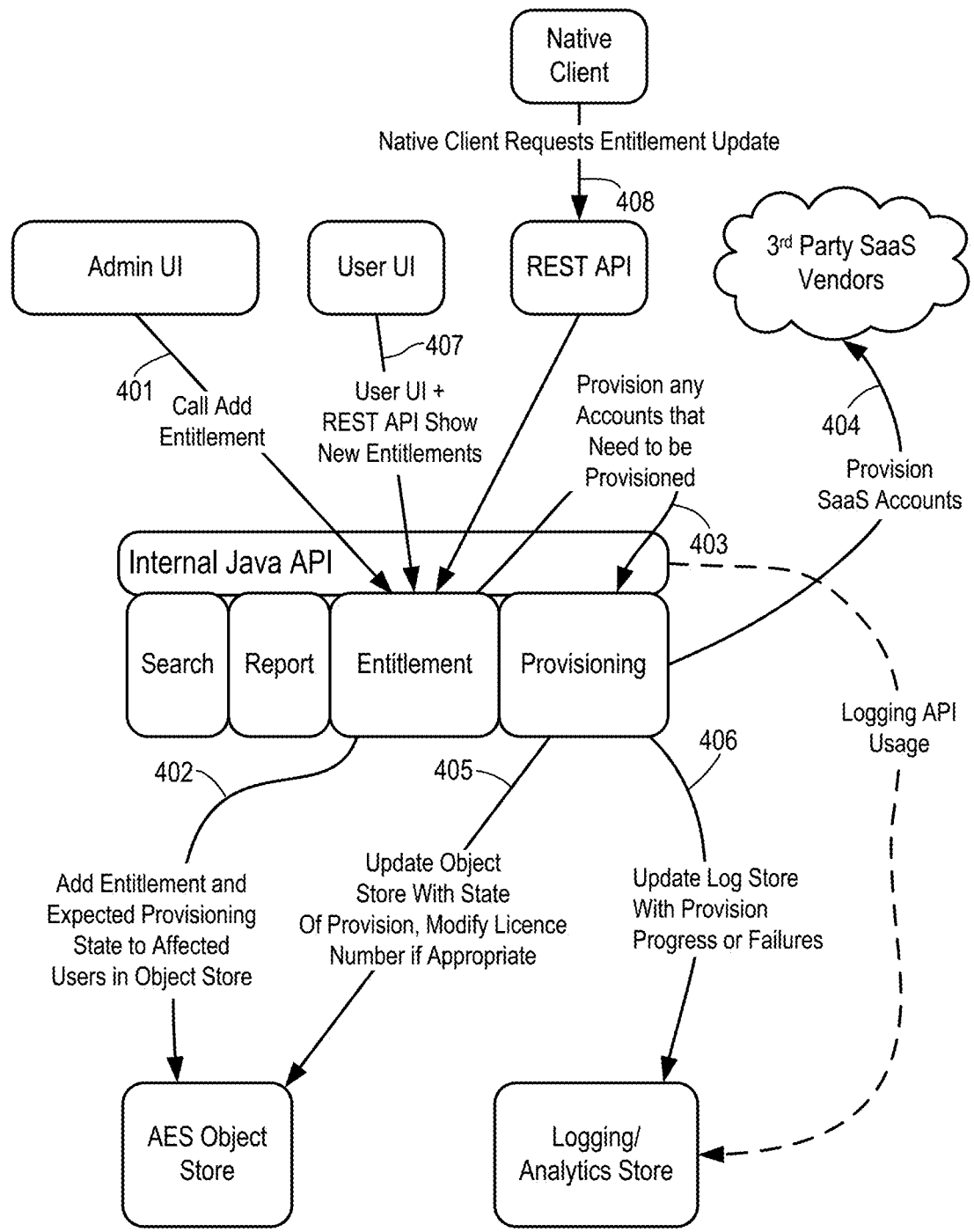
FIG. 4 is a sequence diagram showing a process for entitling and provisioning a new SaaS account, in accordance with an example embodiment.

FIG. 4 is a sequence diagram showing a process for entitling and provisioning a new SaaS account, in accordance with an example embodiment. It will be recalled that an entitlement is a permission that associates a particular user, or group of users, to a particular application, or family of applications. When the entitlement is for an SaaS application, whether it is hosted by a $3^{rd}$ party or within the enterprise's own network, an account is created for each user with the SaaS provider when the entitlement is created. As indicated in the figure, this process might be performed by several of the modules depicted in FIG. 2, in an example embodiment.

In operation 401 of the process, the system receives a call from the administrator web portal (ADMIN UI) to add an entitlement to a SaaS application for a user or group of users, e.g., as the result of a GUI command from an administrator. This call goes to the system's Entitlement module. This call is logged to the Logging/Analytics Store as are any other calls that make use of the Internal Java API. Then in operation 402, the Entitlement module adds the entitlement and expected provisioning state to the AES Object Store's objects for the affected users. In operation 403, the Entitlement module makes a call (e.g., through the Internal Java API) to the Provisioning module to provision any accounts that need to be provisioned. And in operation 404, the Provisioning module makes calls (e.g., through a provisioning API) to the $3^{rd}$ Party SaaS Provider (or Vendor) to provision SaaS accounts for the user or group of users. In operation 405, the Provisioning module updates the pertinent objects in the AES Object Store with the state of the provision and, if appropriate, modifies the number of licenses for the SaaS application. Then in operation 406, the Provisioning module updates the Logging/Analytic Store with the progress (or failure) of the provision. In operation 407, the user web portal (User Web UI) calls the Entitlement module (e.g., through the Internal Java API) to determine whether there are any new entitlements for the user, e.g., as the result of a GUI command from the user (or one of the users in the group of users). And the Entitlement module causes the user web portal to display the added entitlement. Alternatively, in operation 408, a Native Client (e.g., running on a device such as an iPad), calls the Entitlement module (e.g., through the Internal Java API) to determine whether there are any new entitlements for the user, e.g., as the result of a GUI command from the user (or one of the users in the group of users). And the Entitlement module causes the Native Client to display the added entitlement.

Figure 5:
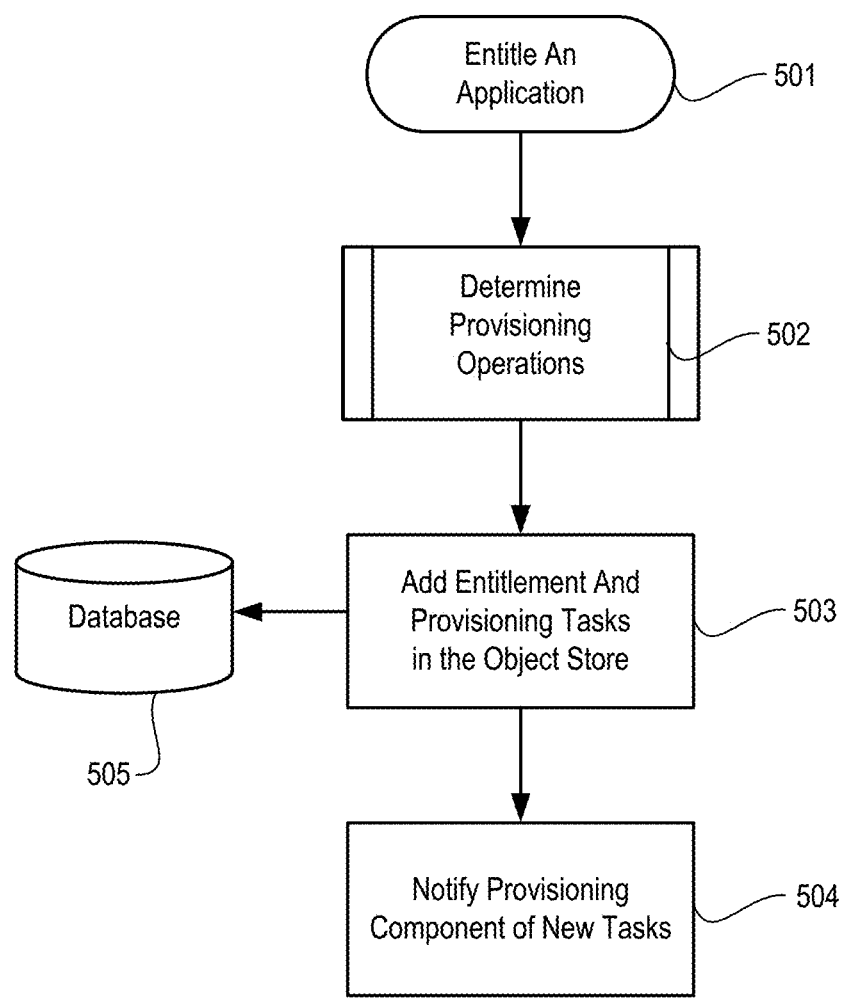
FIG. 5 is a flowchart diagram that illustrates a process for storing provisioning tasks, in accordance with an example embodiment.

FIG. 5 is a flowchart diagram that illustrates a process for storing provisioning tasks, in accordance with an example embodiment. In an example embodiment, the operations in this process might be performed by the system's Entitlement module. The process begins in operation 501 with operations to create an entitlement to an application (e.g., a thin application, a remote application, or a SaaS application) for a user or group of users. In operation 502, the Entitlement module determines which provisioning tasks (or operations) should be performed, e.g., modifying a license number. Then in operation 503, the Entitlement module adds (1) the entitlement and (2) the provisioning tasks to the AES Object Store or other database. In operation 504, the Entitlement module notifies the Provisioning module about the new provisioning tasks, e.g. through the Internal Java API.

Figure 6:
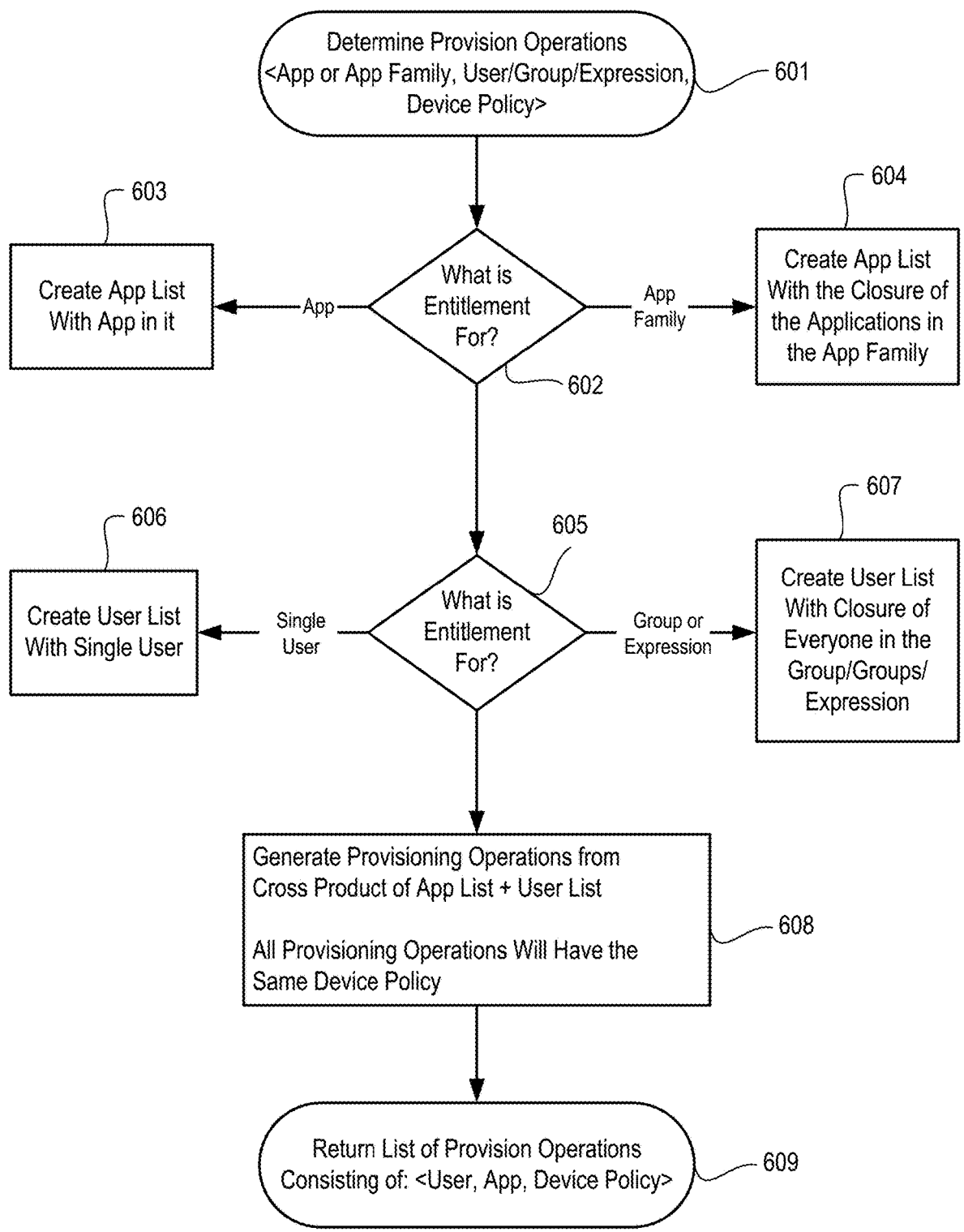
FIG. 6 is a flowchart diagram that illustrates a process for determining provisioning tasks, in accordance with an example embodiment.

FIG. 6 is a flowchart diagram that illustrates a process for determining provisioning tasks, in accordance with an example embodiment. In an example embodiment, the operations in this process might be performed by the system's Entitlement module. The process begins in operation 601 with the receipt of a tuple, e.g., <Application or Application Family, User/Group/Expression, Device Policy>. The expression allows an administrator to exclude users and user groups from policies and to apply policies to multiple groups or partial groups. In operation 602, the Entitlement module determines what the entitlement is for. If the entitlement is for an application, the Entitlement module creates an application list with the application in it, in operation 603. If the entitlement is for an application family, the Entitlement module creates an application list with the closure (or mathematical closure) of the applications in the application family, in operation 604. In operation 605, the Entitlement module determines who the entitlement is for. If the entitlement is for a single user, the Entitlement module creates a user list with a single user, in operation 606. If the entitlement is for a group or expression, the Entitlement module creates a user list with a closure (or mathematical closure) of everyone in the tuple element, user/groups/expression, in operation 607. Then in operation 608, the Entitlement module generates provisioning tasks (or operations) from the cross product of the application list and the user list. In this example, all provisioning tasks (or operations) have the same device policy. In operation 609, the Entitlement module returns a list of provisioning tasks (or operations) in the form of a tuple, e.g., <user, application, device policy>.

Figure 7:
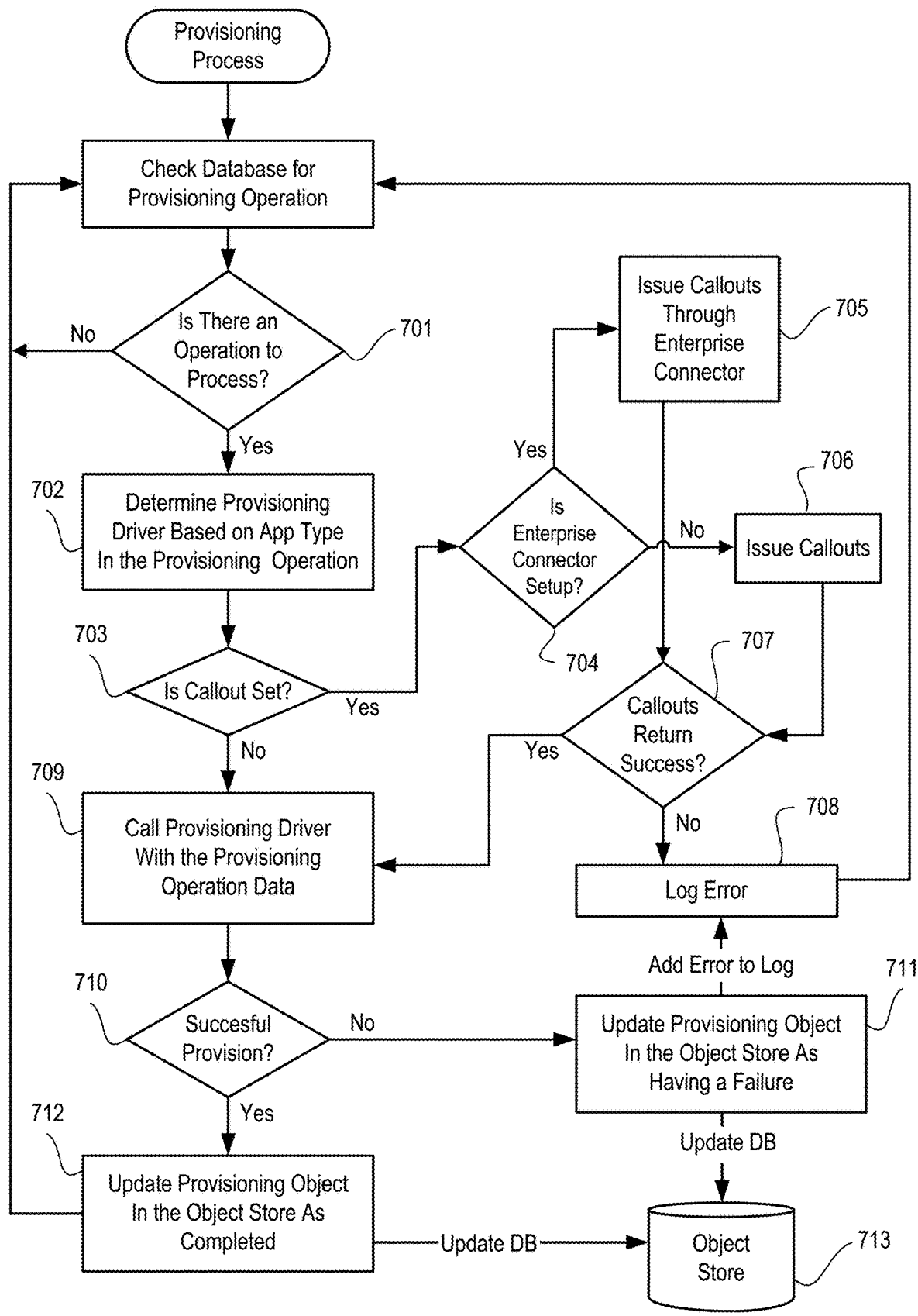
FIG. 7 is a flowchart diagram that illustrates a process for provisioning an application, in accordance with an example embodiment.

FIG. 7 is a flowchart diagram that illustrates a process for provisioning an application, in accordance with an example embodiment. In an example embodiment, the operations in this process might be performed by the system's Provisioning module. In operations 701, the provisioning module determines whether there are any provisioning tasks (or operations) to process in the database (or the AES Object Store 713) where the provisioning tasks are stored, e.g., by the Entitlement module. If not, the Provisioning module remains in a busy loop, waiting for such a task. If there is a provisioning task to process, the Provisioning module determines which provisioning driver to use, based on the application type (e.g., thin application, remote application, SaaS application, etc.) as indicated in the provisioning task, in operation 702. Then, in operation 703, the Provisioning module determines whether a callout flag is set, e.g., whether the provisioning task uses provisioning callouts, e.g., that integrate with existing workflow and licensing processes. If a callout flag is set, the provisioning module determines whether the Enterprise Connector is installed (or set up), in operation 704. If the Enterprise Connector is installed, the Provisioning module issues the provisioning callouts through the Enterprise Connector, in operation 705. If the Enterprise Connector is not installed, the Provisioning module issues the provisioning callouts itself, in operation 706. In operation 707, the Provisioning module determines whether the provisioning callouts were successfully completed, e.g., by the existing workflow and licensing processes. If not, the Provisioning module logs the error, in operation 708, and returns to the beginning of the process, operation 701.

If the provisioning callouts were successful or if provisioning callouts were not used, the Provisioning module calls the applicable provisioning driver, using the provisioning task data, in operation 709. Then, in operation 710, the Provisioning module determines whether the call (or provision) was successful. If not, the Provisioning module updates the provisioning object in the AES Object Store 713 to indicate the failure, in operation 711, and then logs the error and returns to operation 701. If the call to the provisioning driver was successful, the Provisioning module updates the provisioning object in the AES Object Store 713 to indicate completion, in operation 712, and then returns to operation 701.

Figure 8:
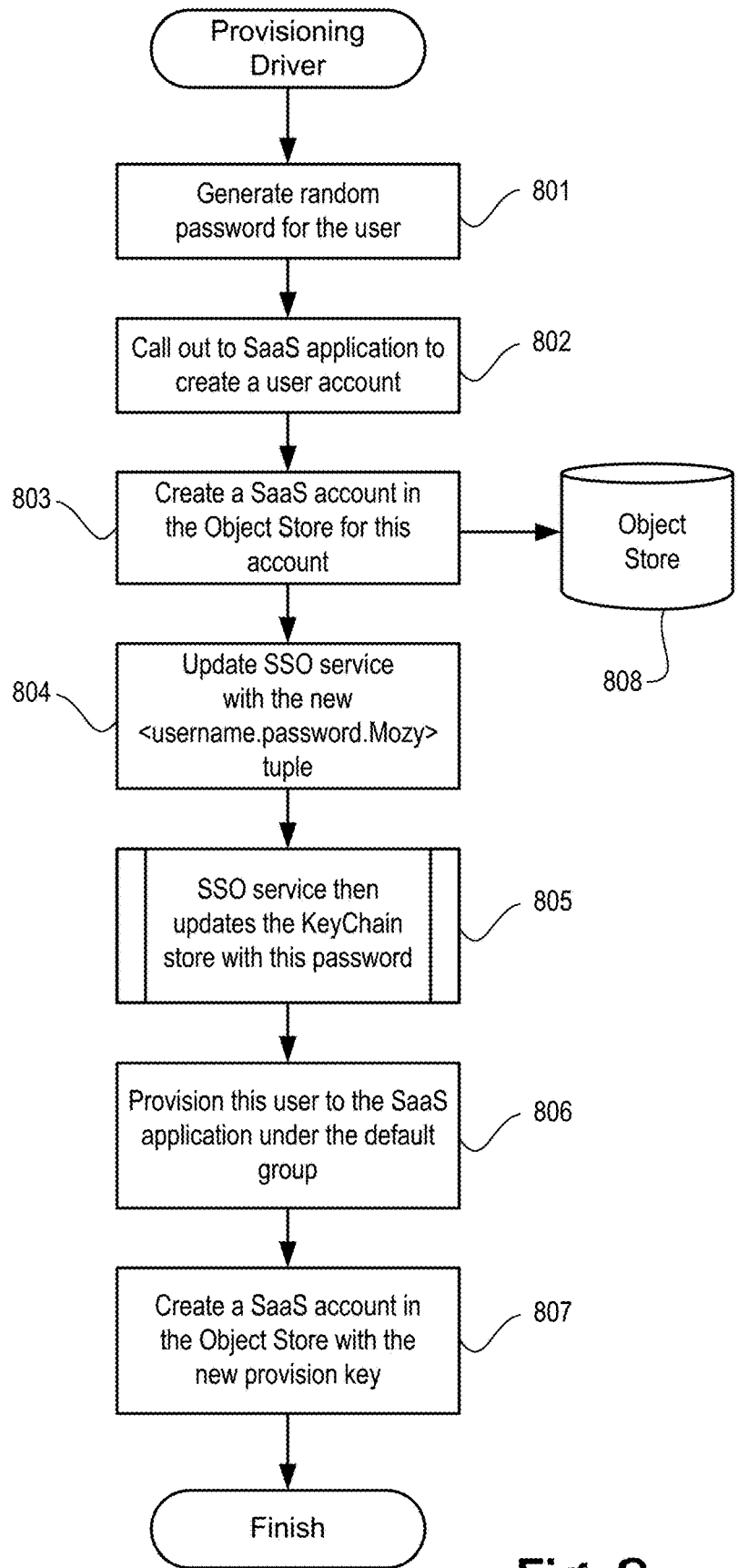
FIG. 8 is a flowchart diagram that illustrates a process for provisioning the Mozy application, in accordance with an example embodiment.

FIG. 8 is a flowchart diagram that illustrates a process carried out by a provisioning driver for provisioning an application that does not support SAML, in accordance with an example embodiment. This example application can be accessed and used through a local client rather than a web browser. Since the SaaS application does not support SAML, the system creates a random password, encrypts, and saves it in operation 801. This password can then be used for SSO to the application, though the user will never see it. This also makes the password uncorrelated with any other passwords, so cracking that password will not allow access to anything other than the particular SaaS application for the particular user's account.

In operation 802, the provisioning driver makes a call to the SaaS application (e.g., through an API) to create an account for the user. The provisioning driver creates an SaaS account in the AES Object Store 808 for the Mozy account, in operation 803. And in operation 804, the provisioning driver updates the SSO service (e.g., through a call using the Internal Java API), with a tuple such as <username, password, name of SaaS application>, where the username is the username for the SaaS application account and the password is the password for the SaaS application account, e.g., the random password. In operation 805, the SSO service updates the KeyChain Store with the password. The provisioning driver provisions the user to the SaaS application under the default group, in operation 806. And in operation 807, the provisioning driver creates a SaaS account in the AES Object Store with the new provision key resulting from that provision.

Figure 9A:
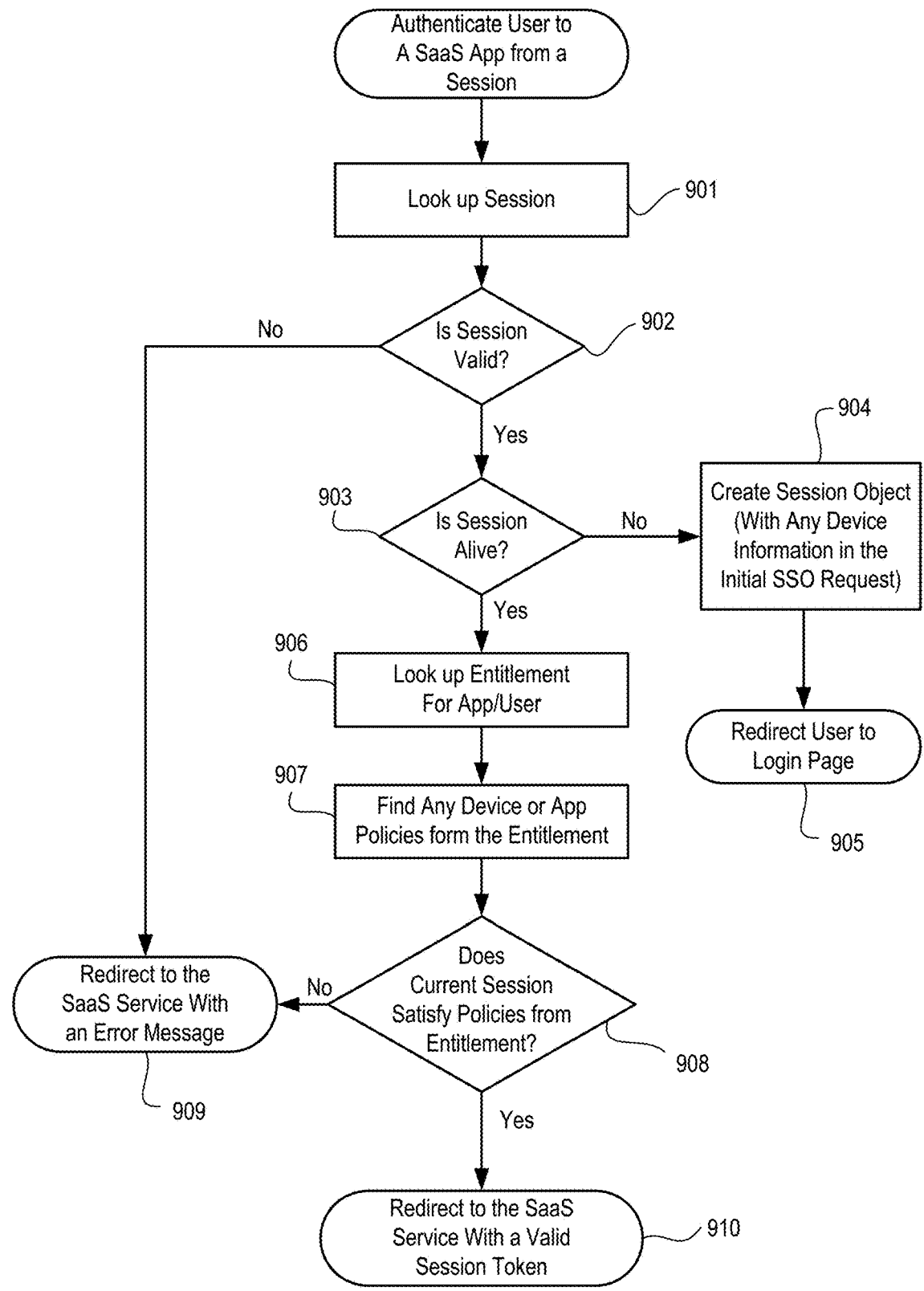
FIGS. 9A and 9B are flowchart diagrams that illustrate a process for authenticating a user to a SaaS application from a session, in accordance with an example embodiment.
Figure 9B:
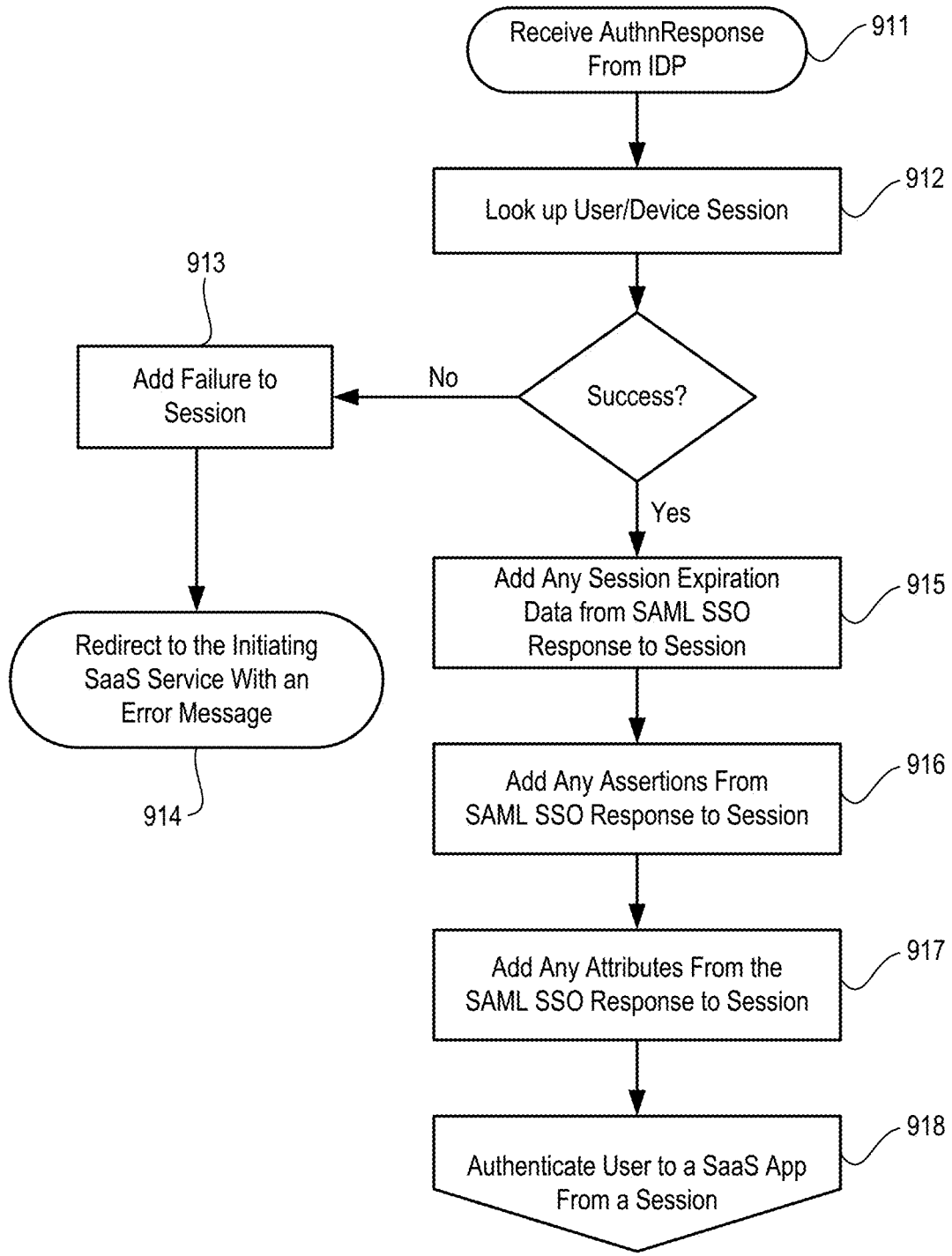

FIGS. 9A and 9B are flowchart diagrams that illustrate a process for authenticating a user to a SaaS application from a session, in accordance with an example embodiment. When a user accesses the system to start an SSO session to access and use a SaaS application, the system will try, in the first instance, to create a token for a SaaS application, based on an existing session. Thus, in operation 901 in FIG. 9A, the system looks up the session and, in operation 902, determines whether the session is valid. If the session is not valid, the system redirects to the SaaS service (e.g., the Application Manager) with an error message. If the session is valid, the system determines whether the session is alive, in operation 903. If not, the system creates a session object with any device information in the initial SSO request, in operation 904, and redirects to the login page, in operation 905, for a credentialed login with a username and password. If the session is alive, the system looks up the user's entitlement for the SaaS application, in operation 906, and ascertains any device or application policies from the entitlement, in operation 907. In operation 908, the system determines whether the current session satisfies those policies. If not, the system redirects to the SaaS service (e.g., the Application Manager) with an error message. If the current session satisfies the policies, the system redirects to the SaaS service (e.g., the Application Manager) with a valid session token, in operation 910 in FIG. 9A.

As indicated above, the system will redirect to a login page in operation 904, if the session is not alive. In an example embodiment, this redirect might occur via the SAML SP (Service Provider) Initiated SSO profile (with the Redirect Bindings). If an Enterprise Connector is installed with the system, the redirect will go to the Enterprise Connector which will now act as an IdP against the internal LDAP store (e.g., AD). The browser on the client device will negotiate an authentication protocol (e.g., Kerberos) and authenticate the user. The Enterprise Connector will then redirect the authenticated user back to the Application Manager via the response portion of SAML SP Initiated SSO profile (over the Redirect Bindings). The Application Manager will then create the SSO session for the SaaS application.

FIG. 9B picks up with the system receiving an authentication response from the IdP (Identity Provider), in operation 911. In operation 912, the system looks up the user/device session for the authentication response. If the authentication is unsuccessful, the system adds the failure to the session, in operation 913, and redirects to the initiating SaaS service (e.g., the Application Manager) with an error message, in operation 914. If the authentication is successful, the system adds any session expiration data from the SAML SSO response to the session, in operation 915. Then in operation 916, the system adds any assertions from the SAML SSO response to the session. And in operation 917, the system adds any attributes from the SAML SSO response to the session. In operation 918, the system completes the authentication of the user to the SaaS application provider from a session.

FIG. 10 shows a GUI view of a dashboard tab displayed by an administrator web portal, in accordance with an example embodiment. As depicted in this figure, a GUI view in an administrator portal might consist of multiple tabs for, e.g., Dashboard, Users, Group, Applications, Licenses, and Policy. Among other things, the Dashboard tab 1001 displays counts for Users Under Management, SaaS Applications Under Management, Desktop Applications Under Management, and GB of Storage Utilized. It will be recalled that the desktop applications might include thin applications such as applications virtualized using VMware ThinApp™ and remote applications accessed by VMware View™, in an example embodiment. The Dashboard tab also displays a list of reports 1002 generated by the system, including reports on: (1) Most active applications; (2) Application usage over time; (3) Most active users; (4) Most active locations (e.g., geolocations); (5) Most recent locations (e.g., geolocations); (6) System utilization; (7) Cost of license under-usage; (8) Cost of license over-subscription; (9) Cost of licenses (table); and (10) cost of licenses (chart).

FIG. 11 shows a GUI view of a users tab displayed by an administrator web portal, in accordance with an example embodiment. Among other things, the Users tab 1101 displays a table of data regarding the users managed by the system. The table's columns include: (1) name; (2) user name; (3) groups; and (4) role. The Users tab 1101 also displays the reports 1102 related to users and includes a GUI control (e.g., a button) 1103 that allows an administrator to add a user.

Figure 12:
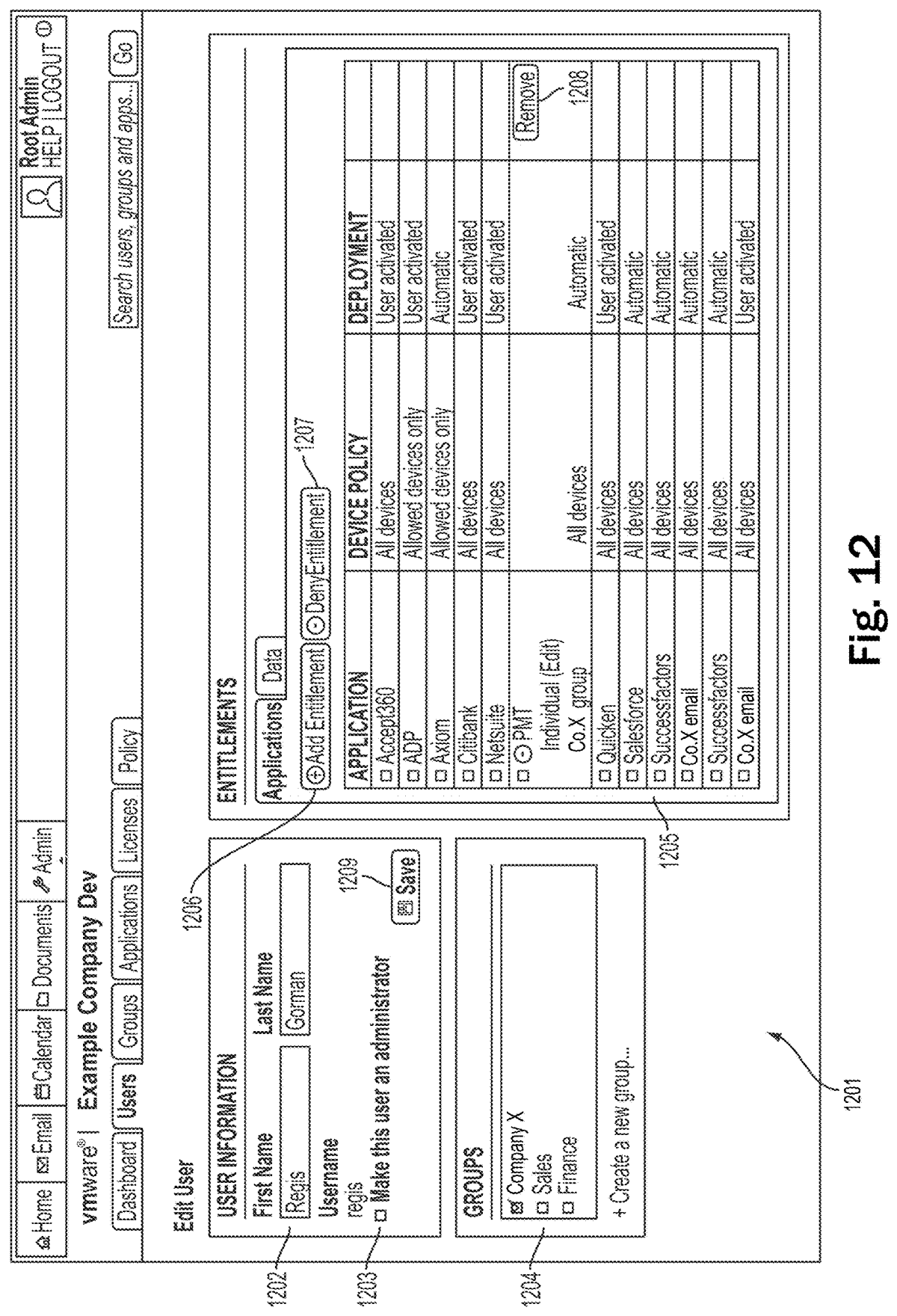

FIG. 12 shows a GUI view of a user edit dialog displayed by an administrator web portal, in accordance with an example embodiment. In an example embodiment, this dialog might be displayed in the Users tab 1101, e.g., when an administrator clicks on a user name in the Users tab 1101. The user edit dialog 1201 includes edit boxes 1202 that allow for editing of a user's first and last name and a check box 1203 that allows the user to be made an administrator. The user edit dialog 1201 also includes check boxes 1204 that allow the user to be made a part of groups such as sales and finance.

Additionally, in an example embodiment, the user edit dialog 1201 lists in a table 1205 the applications to which the user is entitled. The table 1205 has columns for the application name, device (e.g., client device) policy, and deployment. Thus, for example, the user whose name is Regis Gorman is entitled to use the Salesforce application on all devices and deployment is automatic. The user edit dialog 1201 also includes a GUI control (e.g., a button) 1206 to add an entitlement and a GUI control (e.g., a button) 1207 to deny an entitlement. And the user edit dialog 1201 also includes a GUI control (e.g., a button) 1208 to remove an entitlement to an application and a GUI control (e.g., a button) 1209 to save editing changes.

FIG. 13 shows a GUI view of a groups tab displayed by an administrator web portal, in accordance with an example embodiment. Among other things, the Groups tab 1301 displays a table of data regarding the groups managed by the system. The table's columns include: (1) name; (2) number of users; and (3) number of application entitlements. The Groups tab 1301 also displays the reports 1302 (e.g., most active users, most active locations, and most recent locations) related to groups and includes a GUI control (e.g., a button) 1303 that allows an administrator to add a group.

Figure 14:
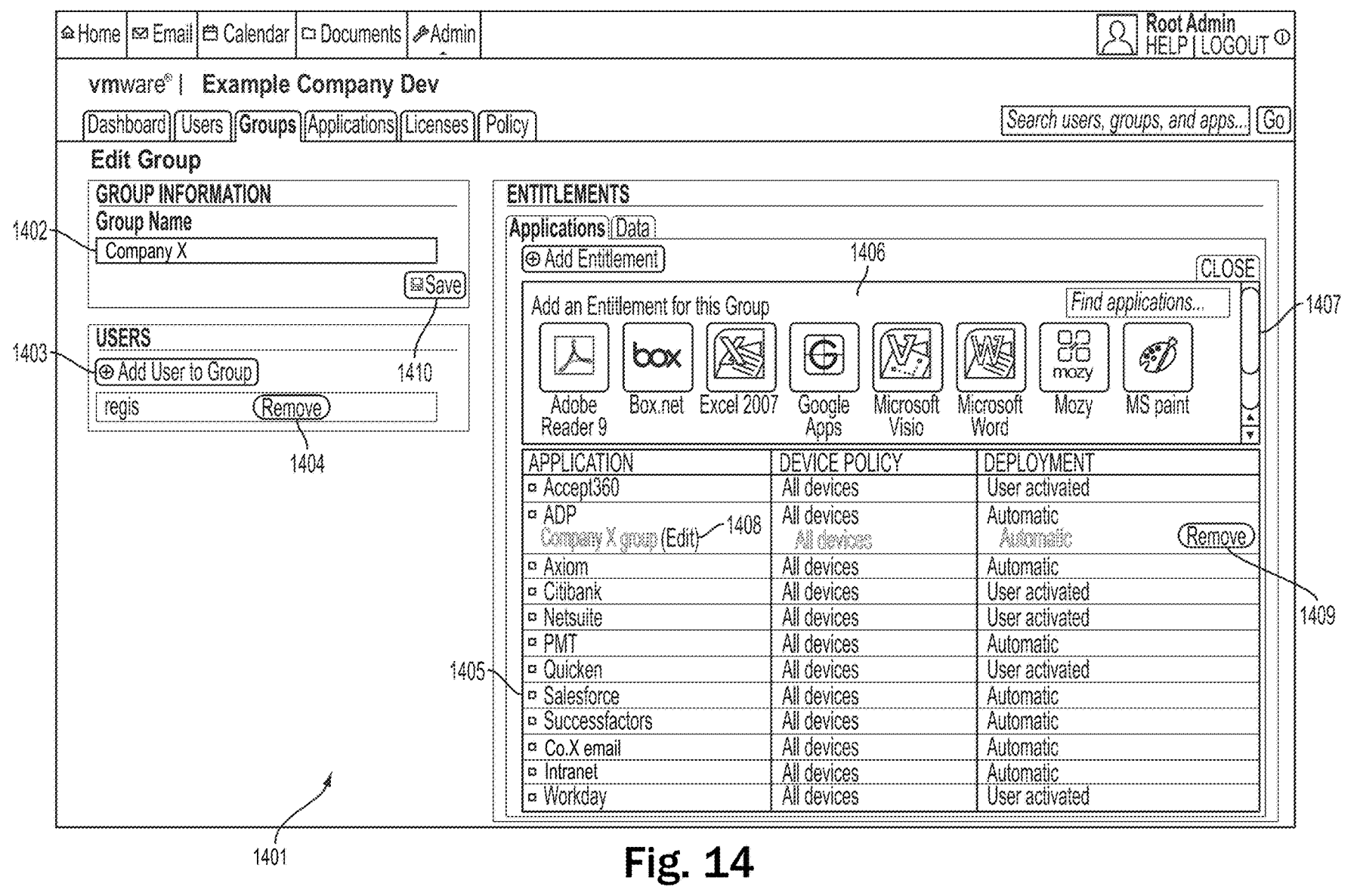

FIG. 14 shows a GUI view of a group edit dialog displayed by an administrator web portal, in accordance with an example embodiment. In an example embodiment, this dialog might be displayed in the Groups tab 1301, e.g., when an administrator clicks on a group name in the Groups tab 1301. The group edit dialog 1401 includes edit box 1402 that allows for editing of a group's name. The group edit dialog 1401 also includes a GUI control (e.g., a button) 1403 that allows a user to be added to a group and a GUI control (e.g., a button) 1404 that allows a user to be removed from a group.

Additionally, in an example embodiment, the group edit dialog 1401 lists in a table 1405 the applications to which a group is entitled. The table 1405 has columns for the application name, device (e.g., client device) policy, and deployment. Thus, for example, the group whose name is Company X is entitled to use the Salesforce application on all devices and deployment is automatic. The group edit dialog 1401 also includes a GUI control (e.g., a tree view) 1406 with a scroll bar 1407 to add an entitlement for the group, e.g., by clicking on the application's icon. And the user edit dialog 1401 also includes GUI control 1408 that allows an entitlement for the group to be edited and a GUI control (e.g., a button) 1409 to remove an entitlement for the group. The user edit dialog 1401 includes GUI control (e.g., a button) 1410 to save editing changes.

Figure 15:
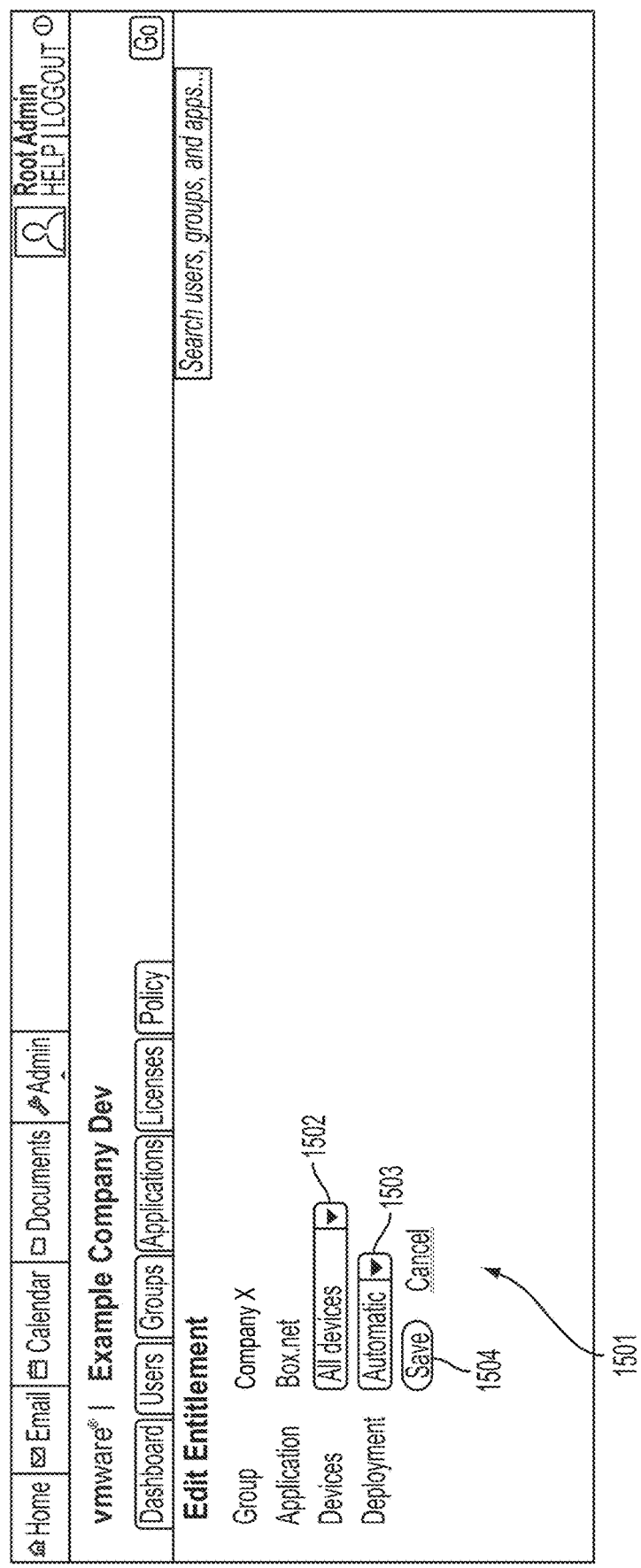
FIG. 15 shows a GUI view of an entitlement edit dialog displayed by an administrator web portal, in accordance with an example embodiment.

FIG. 15 shows a GUI view of an entitlement edit dialog displayed by an administrator web portal, in accordance with an example embodiment. In an example embodiment, this dialog might be displayed when an administrator clicks on a GUI control (e.g., GUI control 1408) in group edit dialog 1401. The entitlement edit dialog 1501 allows for editing of the "Company X" group's entitlement for application Box.net. The edit dialog 1501 includes dropdown list 1502 that allows for changing the devices (e.g., client devices) encompassed within the entitlement and a dropdown list 1503 that allows for changing the deployment of the entitlement. The entitlement edit dialog 1501 also includes a GUI control (e.g., a button) 1504 to save editing changes.

FIG. 16 shows a GUI view of an applications tab displayed by an administrator web portal, in accordance with an example embodiment. Among other things, the Applications tab 1601 displays a table of data regarding the applications managed by the system. The table's columns include: (1) name and description; (2) type (e.g., remote application, native, Google Apps, etc.); and (3) licensing requirement and/or use. The Applications tab 1601 also displays the reports 1602 related to applications and includes a GUI control (e.g., a button) 1603 that allows an administrator to add an application. The Applications tab 1601 also includes a text field 1604 that displays user tips.

Figure 17:
FIG. 17 shows a GUI view of a dialog for adding an application, in accordance with an example embodiment.

FIG. 17 shows a GUI view of a dialog for adding an application, in accordance with an example embodiment. In an example embodiment, this dialog might be displayed in the Applications tab 1601 of an administrator web portal, e.g., when an administrator clicks on GUI control (e.g., a button) 1603 to add an application. The dialog 1701 includes an edit box 1702 for the name of the application and edit box 1703 for a description of the application. The dialog 1701 also includes a checkbox 1704 to indicate whether a license is required.

Additionally, the dialog 1701 includes a list 1705 of radio buttons that identify the application type for the application: (1) pre-configured applications, including email and data sync services; (2) Windows desktop applications, including VMware ThinApp virtualized applications or native MSI (Windows Installer) applications; (3) SaaS applications that are web-based applications like Workday or Salesforce; and (4) published (or remote) applications such as the Microsoft Terminal Services (RDS) application or the Citrix XenApp application. It will be appreciated that as depicted in FIG. 17, the top radio button in list 1705 has been checked. And consequently, dialog 1701 displays the icons 1706 for four pre-configured applications managed by the system: (A) VMware View; (B) Mozy; (C) Google Apps; (D) Box.net; and (E) Salesforce. Dialog 1701 also includes a GUI control (e.g., a button) 1707 to save editing changes.

Figure 18:
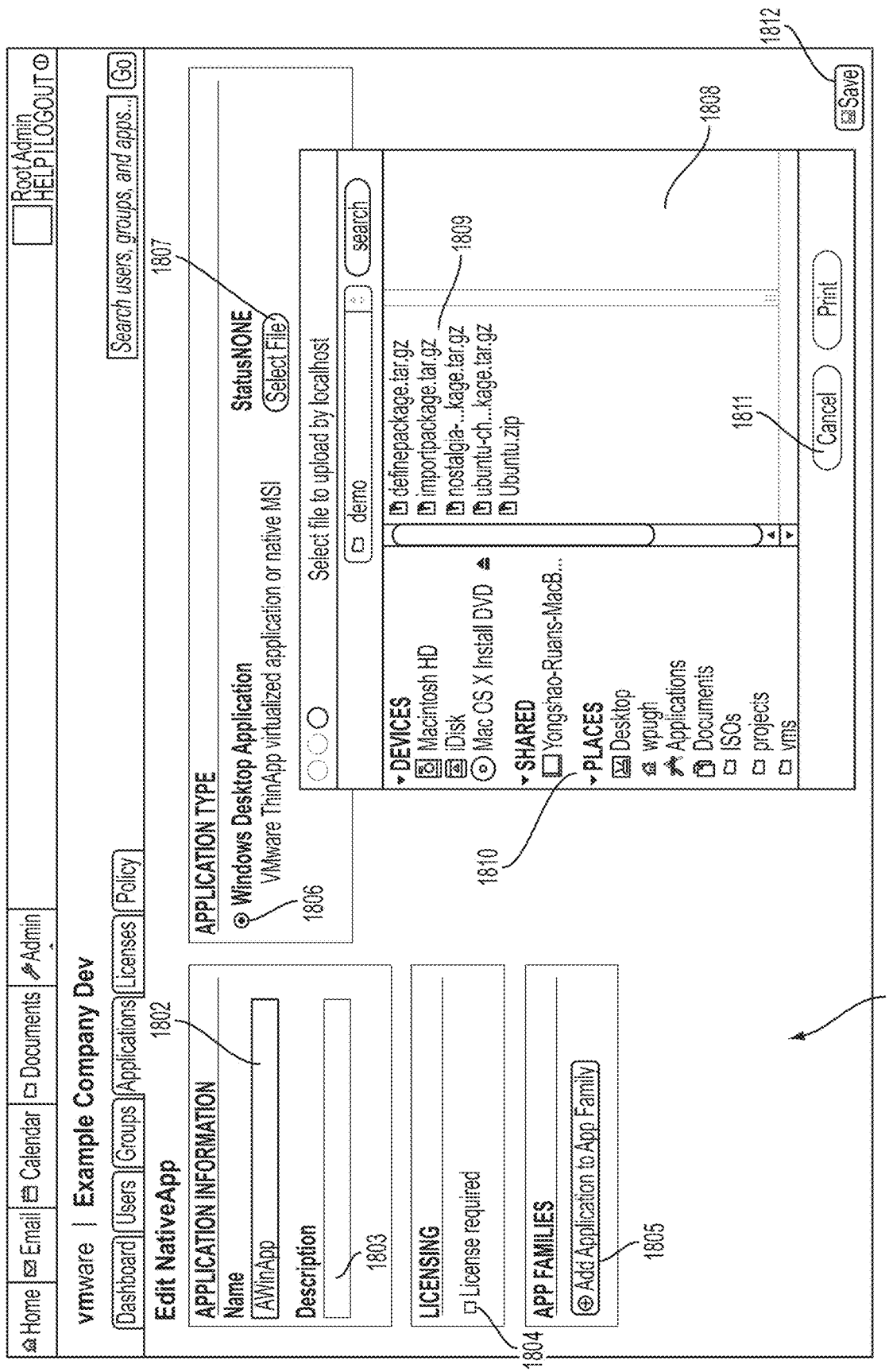
FIG. 18 shows a GUI view of an edit dialog for editing a Windows desktop application, in accordance with an example embodiment.

FIG. 18 shows a GUI view of an edit dialog for editing a Windows desktop application, in accordance with an example embodiment. In an example embodiment, this dialog might be displayed in the Applications tab 1601 of an administrator web portal, e.g., when an administrator clicks on an application icon displayed when a user selects the radio button for Windows desktop application in list 1705 of radio buttons in dialog 1701. The edit dialog 1801 includes an edit box 1802 which allows the name of the Windows desktop application to be edited and an edit box 1803 which allows the description of the Windows desktop application to be edited. The edit dialog 1801 also includes a checkbox 1804 to indicate whether a license is required. And the edit dialog 1801 includes a GUI control (e.g., a button) 1805 to add the Windows desktop application to an application family and a GUI control (e.g., a button) 1806 to edit application type.

Additionally, edit dialog 1801 includes a GUI control (e.g., a button) 1807 that allows the administrator to select a file to be uploaded by a local host computer, e.g., the host computer of a user entitled to use the Windows desktop application. After clicking on GUI control 1807, pop-up dialog 1808 is displayed, which allows the administrator to select the file using a mouse and/or keyboard from a list of files 1809 in a directory. Pop-up dialog 1808 also allows the administrator to select a location from a list of locations (e.g., DEVICES, SHARED, and PLACES) 1810, using a mouse and/or keyboard. And pop-up dialog 1808 includes GUI control (e.g., a button) that allows for cancellation of the file selection operation.

Figure 19:
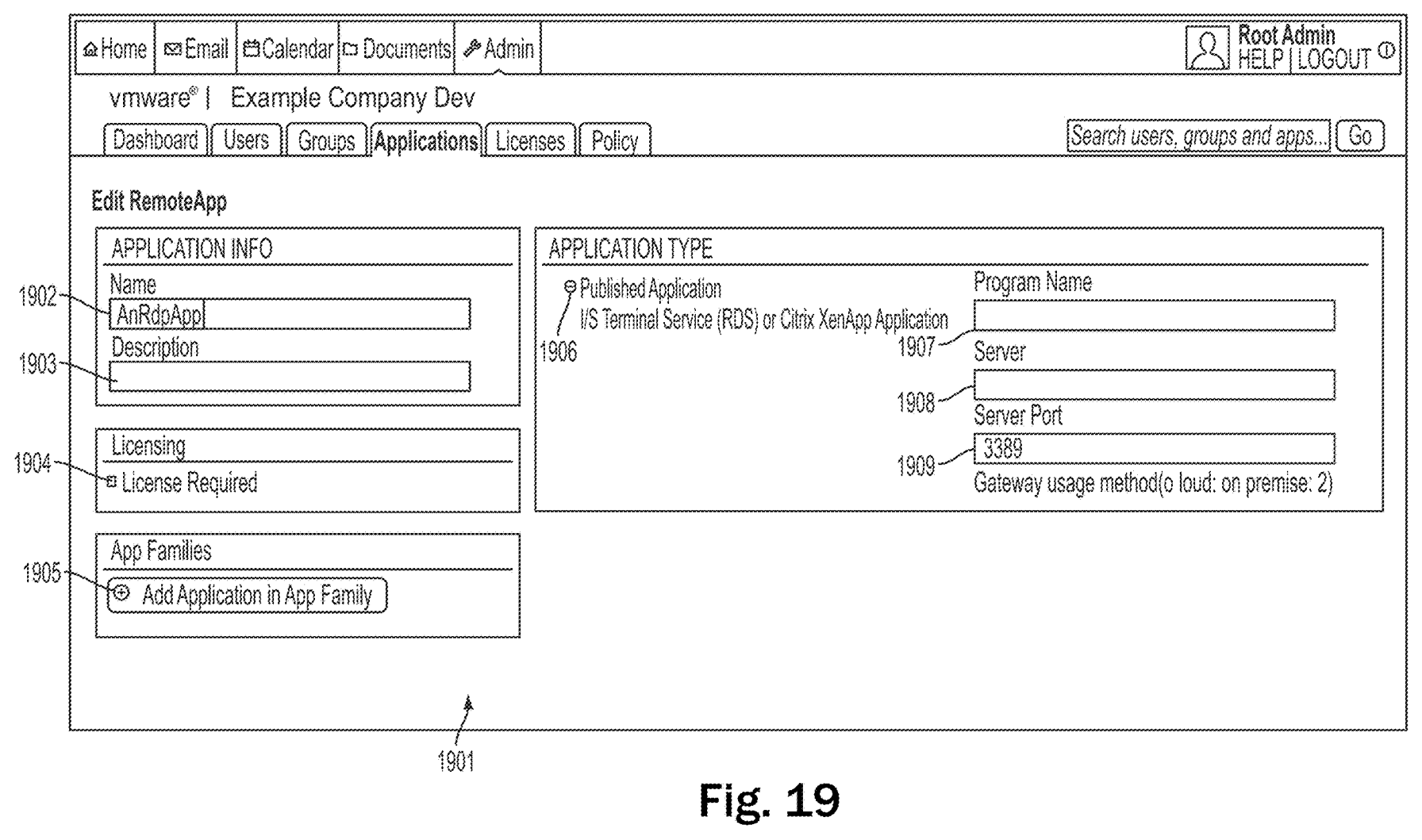

FIG. 19 shows a GUI view of an edit dialog for editing a published (or remote) application, in accordance with an example embodiment. In an example embodiment, this dialog might be displayed in the Applications tab 1601 of an administrator web portal, e.g., when an administrator clicks on an application icon displayed when a user selects the radio button for published application in list 1705 of radio buttons in dialog 1701. The edit dialog 1901 includes an edit box 1902 which allows the name of the published application to be edited and an edit box 1903 which allows the description of the Windows desktop application to be edited. The edit dialog 1901 also includes a checkbox 1904 to indicate whether a license is required. And the edit dialog 1901 includes a GUI control (e.g., a button) 1905 to add the published application to an application family and a GUI control (e.g., a button) 1906 to edit application type. Additionally, edit dialog 1901 includes an edit box 1907 for the program name, edit box 1908 for the server identifier, and edit box 1909 for the server port.

FIG. 20 shows a GUI view of a licenses tab displayed by an administrator web portal, in accordance with an example embodiment. Among other things, the Licenses tab 2001 displays a table of data regarding the licenses managed by the application-management system. The table's columns include: (1) the applications licensed; (2) quantity of licenses; and (3) the cost per license. The licenses tab 2001 also displays the reports 2002 related to the licenses.

Figure 21:
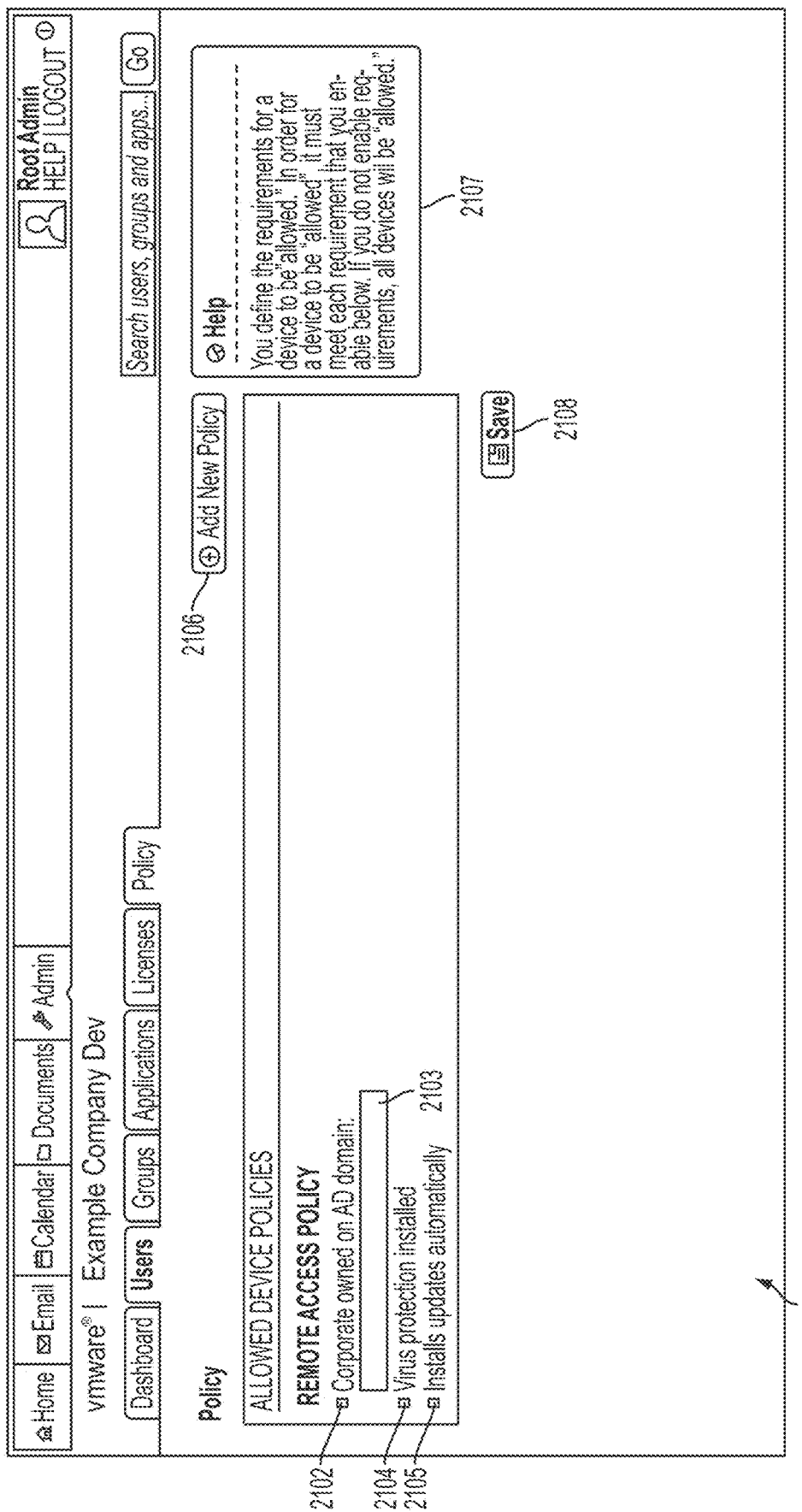
FIG. 21 shows a GUI view of a policy tab displayed by an administrator web portal, in accordance with an example embodiment.

FIG. 21 shows a GUI view of a policy tab displayed by an administrator web portal, in accordance with an example embodiment. Among other things, the policy tab 2101 allows an administrator to set polices relating to client devices which, in turn, will determine application entitlement. The policy tab 2101 displays three checkboxes and an edit box for setting a policy for remote access by a client device. If checked, checkbox 2102 indicates that the client device must be corporate owned on an AD domain. It will be appreciated that such a policy might be applicable to an application that accesses sensitive records, such as personnel records or medical records. The related edit box 2103 allows the AD domain to be identified. If checked, checkbox 2104 indicates that virus protection must be installed on the client device. And if checked, checkbox 2105 indicates that updates must be automatically installed on the client device (e.g., Windows operating system updates, virus definition updates, etc.).

This policy is intended to be illustrative and not limiting. Another device policy might require that Windows be installed. Or the device policy might pertain to the channel (or connection) used to access the AD domain, e.g., LAN, WAN, name-password protected, secure-ID protected, etc. Further still, the device policy might pertain to geolocation, e.g., an application can only be used on a client device if the client device is located within the jurisdictional boundaries of a particular governmental entity.

Additionally, policy tab 2101 includes a GUI control (e.g., a button) 2106 that allows an administrator to add a new policy and a text field 2107 that displays user tips. And policy tab 2101 includes a GUI control (e.g., a button) 2108 to save editing changes.

Figure 22:
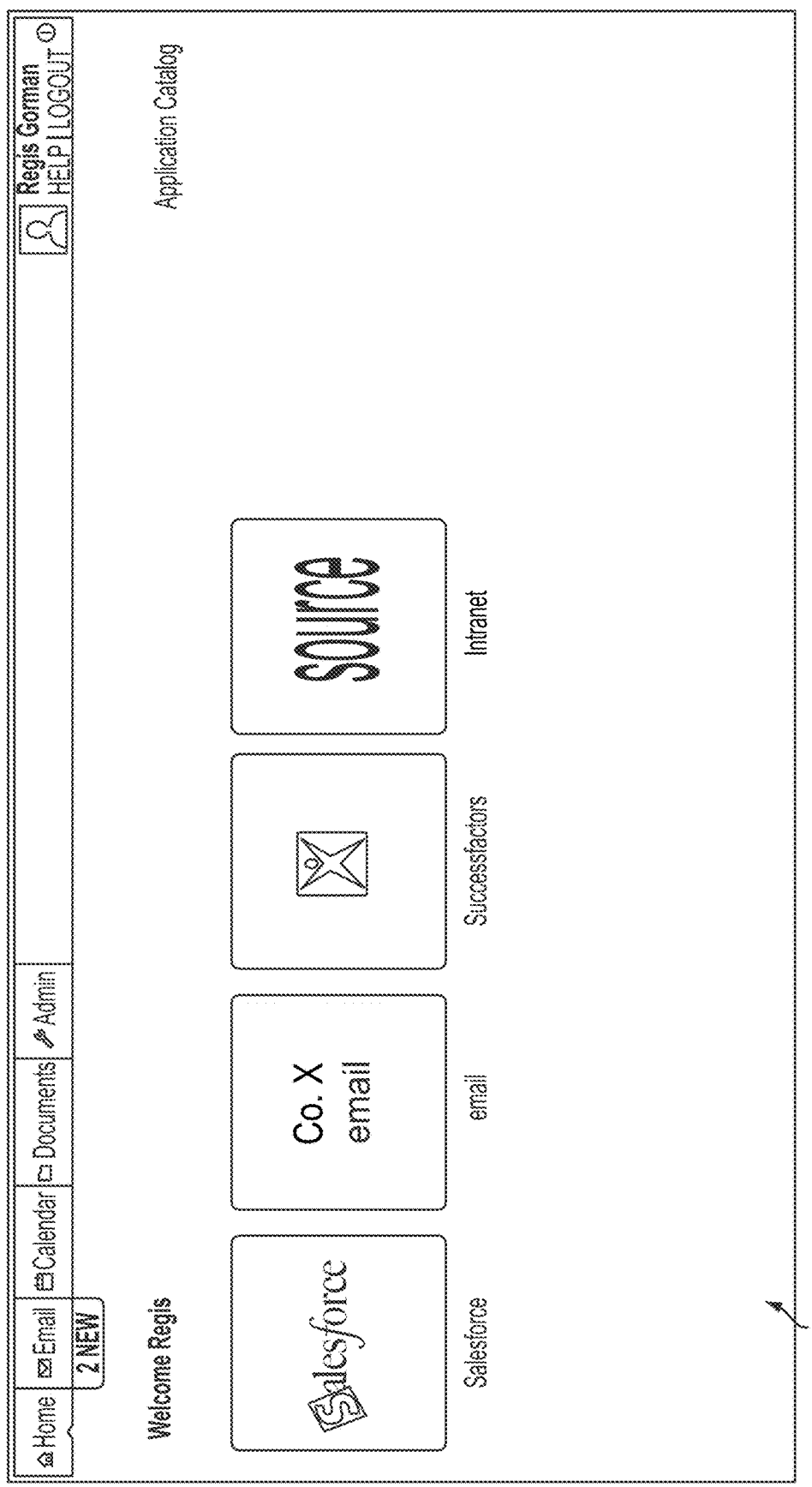
FIG. 22 shows a GUI view displayed by a user web portal, in accordance with an example embodiment.

FIG. 22 shows a GUI view displayed by a user web portal, in accordance with an example embodiment. In an example embodiment, this view might be displayed by the system after a user (e.g., Regis Gorman) logs in. View 2201 lists icons of the applications that the user is entitled to and that have been enabled. If a user clicks on an icon, the application will launch in a relatively seamless manner.

It will be appreciated that GUI view 2201 is intended to be illustrative rather than limiting. If the client device is a Windows device, GUI view 2201 might also include icons added to the Start menu and status alerts as to the applications in the status bar, in order to provide the user with a sense of seamlessness. Of course, enhancements of a similar nature might also be made to GUI view 2201 when displayed on an Apple device, to promote seamlessness.

Figure 23:
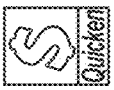
FIG. 23 shows another GUI view displayed by a user web portal, in accordance with an example embodiment.

FIG. 23 shows another GUI view displayed by a user web portal, in accordance with an example embodiment. In an example embodiment, this view might be displayed by the application-manager system after a user (e.g., Regis Gorman) logs in. View 2301 lists icons of the applications that the user is entitled to and that have been enabled, e.g., Salesforce, as well as the applications that the user is entitled to, but has not enabled, e.g., Workday. In an example embodiment, the user can install an application by clicking on install button.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments have been described in some detail for purposes of clarity of understanding, it will be apparent that certain changes and modifications can be practiced within the scope of the following claims. For example, the processes described herein might be used to provision Platform as a Service (PaaS) or Infrastructure as a Service (IaaS), in addition to Software as a Service (SaaS), thin applications, remote applications, etc. Further, the process operations described above can be ordered, modularized, and/or distributed in any suitable way.

Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method comprising:
   receiving a user request for a software as a service (SaaS) application; and
   in response to the user request, provisioning the SaaS application for a user, the provisioning the SaaS application comprising:
     generating a random password configured for single sign-on for the user;
     providing a request to the SaaS application to create an account for the user;
     updating a single sign-on service with received user account information including the random password;
     provisioning the SaaS application for the user; and
     creating a SaaS account in an application entitlement object store with a new provision key that provides single sign-on access to the SaaS application to the user using the random password and without providing the random password to the user.

2. The method of claim 1, wherein updating the single sign-on service comprises providing a tuple of username, password, and name of SaaS application to the single sign-on service.

3. The method of claim 1, where the user request for the SaaS application is received in response to a graphical user interface displaying a plurality of applications on a client device associated with the user.

4. The method of claim 1, further comprising:
   receiving a subsequent request from the user for access to the SaaS application;
   determining an existing user session;
   determining whether the existing user session is active; and
   generating a second token for the SaaS application based on the existing user session.

5. The method of claim 1, wherein, in response to the user request for the SaaS application, the new provision key is used to decrypt an encrypted version of the random password used by the single sign-on service.

6. The method of claim 1, further comprising, in response to a subsequent user request to access the SaaS application:
   determining that a valid session exists;
   determining whether the valid session is alive or not;
   in response to determining that the valid session is alive, creating a token for the SaaS application based on the valid session and redirecting to the SaaS application; and
   in response to determining that the valid session is not alive, creating a session object with information from an initial single sign-on request of the valid session and using the session object to perform a single sign-on operation for the SaaS application.

7. The method of claim 6, wherein a client device of the user uses the token to perform the single sign-on operation to the SaaS application comprising using the token to access the random password associated with the account of the user.

8. A system comprising:
   one or more computers and one or more storage devices storing instructions that are operable, when executed by the one or more computers, to cause the one or more computers to perform operations comprising:

receiving a user request for a software as a service (SaaS) application; and in response to the user request, provisioning the SaaS application for a user, the provisioning the SaaS application comprising:

generating a random password configured for single sign-on for the user;

providing a request to the SaaS application to create an account for the user;

updating a single sign-on service with received user account information including the random password;

provisioning the SaaS application for the user; and creating a SaaS account in an application entitlement object store with a new provision key that provides single sign-on access to the SaaS application to the user using the random password and without providing the random password to the user.

9. The system of claim 8, wherein updating the single sign-on service comprises providing a tuple of username, password, and name of SaaS application to the single sign-on service.

10. The system of claim 8, where the user request for the SaaS application is received in response to a graphical user interface displaying a plurality of applications on a client device associated with the user.

11. The system of claim 8, the operations further comprising:

receiving a subsequent request from the user for access to the SaaS application;

determining an existing user session;

determining whether the existing user session is active; and generating a second token for the SaaS application based on the existing user session.

12. The system of claim 8, wherein, in response to the user request for the SaaS application, the new provision key is used to decrypt an encrypted version of the random password used by the single sign-on service.

13. The system of claim 8, the operations further comprising, in response to a subsequent user request to access the SaaS application:

determining that a valid session exists;

determining whether the valid session is alive or not;

in response to determining that the valid session is alive, creating a token for the SaaS application based on the valid session and redirecting to the SaaS application; and in response to determining that the valid session is not alive, creating a session object with information from an initial single sign-on request of the valid session and using the session object to perform a single sign-on operation for the SaaS application.

14. The system of claim 13, wherein a client device of the user uses the token to perform the single sign-on operation to the SaaS application comprising using the token to access the random password associated with the account of the user.

15. One or more non-transitory computer storage media encoded with computer program instructions that when executed by one or more computers cause the one or more computers to perform operations comprising:

receiving a user request for a software as a service (SaaS) application; and in response to the user request, provisioning the SaaS application for a user, the provisioning the SaaS application comprising:

generating a random password configured for single sign-on for the user;

providing a request to the SaaS application to create an account for the user;

updating a single sign-on service with received user account information including the random password;

provisioning the SaaS application for the user; and creating a SaaS account in an application entitlement object store with a new provision key that provides single sign-on access to the SaaS application to the user using the random password and without providing the random password to the user.

16. The one or more non-transitory computer storage media of claim 15, wherein updating the single sign-on service comprises providing a tuple of username, password, and name of SaaS application to the single sign-on service.

17. The one or more non-transitory computer storage media of claim 15, where the user request for the SaaS application is received in response to a graphical user interface displaying a plurality of applications on a client device associated with the user.

18. The one or more non-transitory computer storage media of claim 15, the operations further comprising:

receiving a subsequent request from the user for access to the SaaS application;

determining an existing user session;

determining whether the existing user session is active; and generating a second token for the SaaS application based on the existing user session.

19. The one or more non-transitory computer storage media of claim 15, wherein, in response to the user request for the SaaS application, the new provision key is used to decrypt an encrypted version of the random password used by the single sign-on service.

20. The one or more non-transitory computer storage media of claim 15, the operations further comprising, in response to a subsequent user request to access the SaaS application:

determining that a valid session exists;

determining whether the valid session is alive or not;

in response to determining that the valid session is alive, creating a token for the SaaS application based on the valid session and redirecting to the SaaS application; and in response to determining that the valid session is not alive, creating a session object with information from an initial single sign-on request of the valid session and using the session object to perform a single sign-on operation for the SaaS application.

21. The one or more non-transitory computer storage media of claim 20, wherein a client device of the user uses the token to perform the single sign-on operation to the SaaS application comprising using the token to access the random password associated with the account of the user.

* * * * *